(12) United States Patent
Awatsuji et al.

(10) Patent No.: US 10,001,405 B2
(45) Date of Patent: Jun. 19, 2018

(54) MEASUREMENT DEVICE FOR OBTAINING AMPLITUDE INFORMATION OF AN OBJECT

(71) Applicant: NATIONAL UNIVERSITY CORPORATION KYOTO INSTITUTE OF TECHNOLOGY, Kyoto-shi (JP)

(72) Inventors: Yasuhiro Awatsuji, Kyoto (JP); Peng Xia, Kyoto (JP)

(73) Assignee: National University Corporation Kyoto Institute of Technology, Kyoto (JP)

(*) Notice: Subject to any disclaimer, the term of this patent is extended or adjusted under 35 U.S.C. 154(b) by 214 days.

(21) Appl. No.: 14/784,744

(22) PCT Filed: Mar. 20, 2014

(86) PCT No.: PCT/JP2014/057701
§ 371 (c)(1),
(2) Date: Oct. 15, 2015

(87) PCT Pub. No.: WO2014/171256
PCT Pub. Date: Oct. 23, 2014

(65) Prior Publication Data
US 2016/0061656 A1    Mar. 3, 2016

(30) Foreign Application Priority Data
Apr. 16, 2013  (JP) .................................. 2013-085624

(51) Int. Cl.
*H01L 27/00*     (2006.01)
*G01J 1/04*       (2006.01)
(Continued)

(52) U.S. Cl.
CPC ............ *G01J 1/0429* (2013.01); *G01B 11/24* (2013.01); *G01J 1/44* (2013.01); *G02B 21/0016* (2013.01); *G02B 21/14* (2013.01)

(58) Field of Classification Search
CPC ....... G03H 1/041; G03H 1/06; G03H 2240/52
See application file for complete search history.

(56) References Cited

U.S. PATENT DOCUMENTS 5,598,261 A * 1/1997 Duncan .................... G01J 9/00
                                                      250/201.9
2004/0070767 A1   4/2004 Tobiason et al.

FOREIGN PATENT DOCUMENTS

| JP | 2004-138617 A | 5/2004 |
| JP | 4294526 B2    | 7/2009 |
| JP | 2011-099781 A | 5/2011 |

OTHER PUBLICATIONS

International Search Report dated Jun. 6, 2014 with English Translation issued in International Application No. PCT/JP2014/057701, pp. 1-5.

(Continued)

*Primary Examiner* — Thanh Luu
(74) *Attorney, Agent, or Firm* — MH2 Technology Law Group, LLP

(57) ABSTRACT

A complex amplitude information measurement apparatus (10) according to the present invention includes pixel sensor groups for generating a difference from one pixel sensor group to another in the optical distance of object light traveling from a measurement object (100); a camera (15) provided with an image sensor for recording, with a single-shot exposure, the object light that has passed through or been reflected from the pixel sensor groups to obtain intensity information of the measurement object; and a computer (Continued)

(16) for computing, on the basis of the intensity information, phase information of the measurement object (100).

8 Claims, 15 Drawing Sheets

(51) Int. Cl.
*G01B 11/24* (2006.01)
*G02B 21/00* (2006.01)
*G01J 1/44* (2006.01)
G02B 21/14 (2006.01)

(56) References Cited

OTHER PUBLICATIONS

Shirai, Tomohiro, Phase Information Hidden in the Intensity Distribution. Japanese Journal of Optics. 2009, vol. 38, No. 10, pp. 496-502.
Zuo, Chao et al. Single-shot quantitative phase microscopy with the traneport-of-intensity equation. Proceedings of SPIE, International Conference on Optics in Precision Engineering and Nenotechnology , 2013, vol. 8769, Pt. 2, pp. 876931-1-876931-5.
Goodman, J.W. et al. Digital Image Formation From Electronically Detected Holograms. Applied Physics Letters, 1967, vol. 11, No. 3, pp. 77-79.
Teague, Michael Reed. Deterministic phase retrieval: a Green's function solution. Journal of the Optical Society of America, 1983, vol. 73, No. 11, pp. 1434-1441.

\* cited by examiner

Fig. 5
Fig. 6
Fig. 7
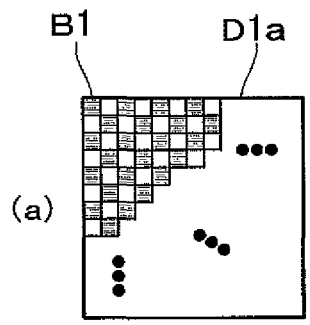
(a)
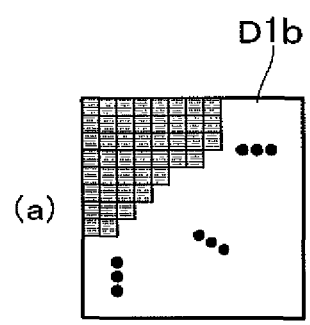
(a)
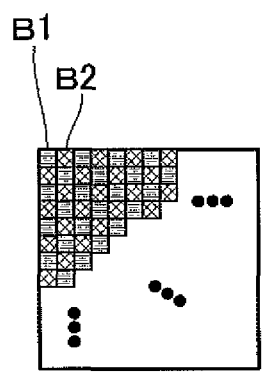
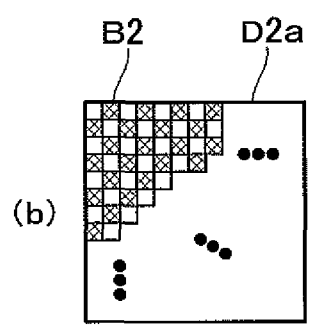
(b)
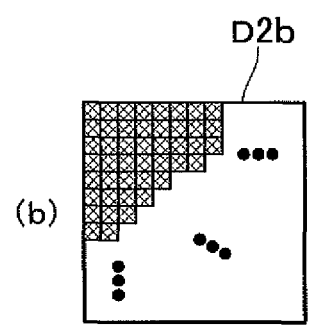
(b)
Fig. 8
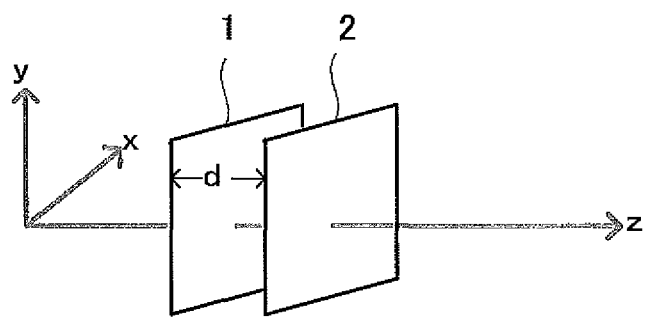

(a)

(b)

(a)

(b)

(a)

(b)

Fig. 16　　　Fig. 17　　　Fig. 18
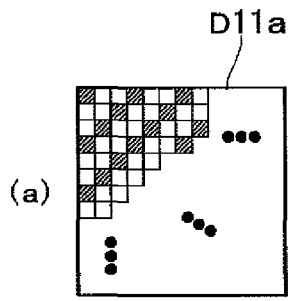
D11a
(a)
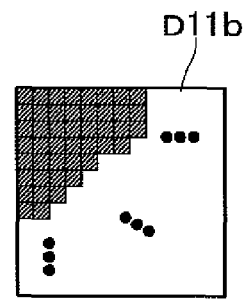
D11b
(a)
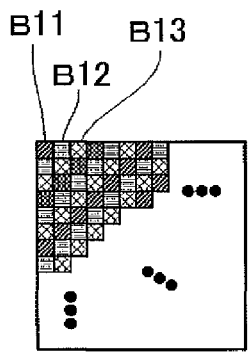
B11 B12 B13
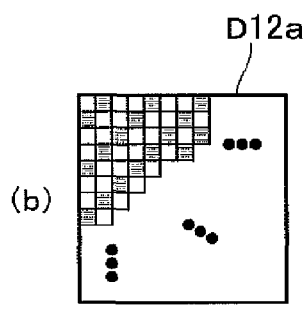
D12a
(b)
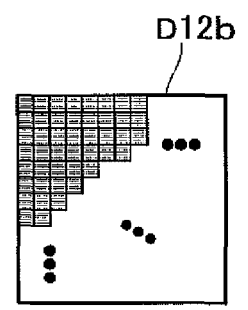
D12b
(b)
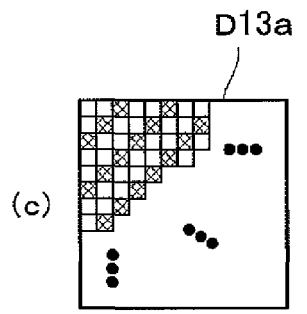
D13a
(c)
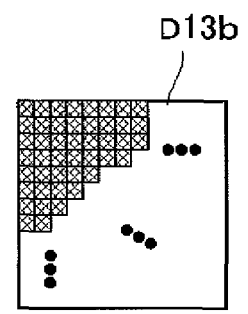
D13b
(c)
Fig. 19
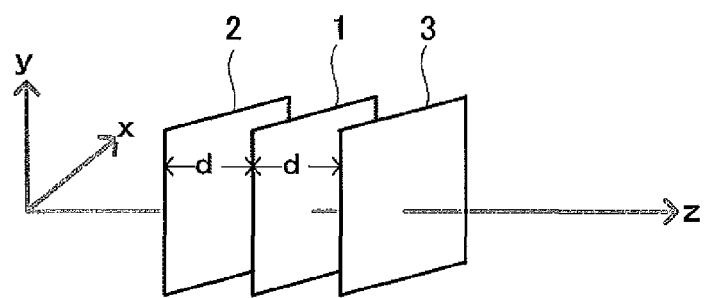

MEASUREMENT DEVICE FOR OBTAINING AMPLITUDE INFORMATION OF AN OBJECT

CROSS-REFERENCE TO RELATED APPLICATIONS

This application is a U.S. National Stage application of PCT/JP2014/057701 filed 20 Mar. 2014, which claims priority to Japanese Application No. 2013-085624 filed 16 Apr. 2013, the entire disclosures of which are hereby incorporated by reference in their entireties.

TECHNICAL FIELD

The present invention relates to a measurement apparatus for obtaining complex amplitude information of an object.

BACKGROUND ART

Recent industrial development has created a demand for high-precision, high-speed measuring techniques. To respond to the demand, it is essential to develop optical measurement techniques with various features, such as high sensitivity and parallel processing.

The simplest method for observing fast phenomena, such as the motion or slight shape change of an object, is to directly photograph the object with a high-speed camera. To obtain object information, complex amplitude information (i.e., luminance information (intensity information) as well as phase information) is required. However, the method using a high-speed camera can only record the intensity information of an object, and cannot be applied to a transparent object.

To solve this problem, Patent Literature 1 and Non-Patent Literature 1 disclose optical measurement techniques based on interferometric techniques. A variety of interferometric techniques have been proposed, and FIG. 29 shows an optical system using a holography apparatus as an example of interferometric techniques.

In the holography apparatus 50 shown in FIG. 29, a beam splitter 52 separates a laser beam emitted from a laser light source 51 into light to illuminate an object (object light) and reference light. The object light illuminates a measurement object 100 through an objective lens 53a, lens 54a, and mirror 55a, and light that has been reflected from the measurement object 100 enters a camera 57 through a beam splitter 56. The reference light, on the other hand, enters the camera 57 through a path where the measurement object 100 is absent, more specifically through a mirror 55b, objective lens 53b, lens 54b, mirror 55c, and beam splitter 56. This enables the camera 57 to record the interference pattern (the interference fringe pattern) of the reference light and the object light, and a computer performs a predetermined computation on the basis of the interference pattern to thereby determine the complex amplitude information (intensity information and phase information) of the measurement object 100.

Interferometric techniques, however, employ light interference and thus have the following drawbacks:
the optical system is complex because of the use of many optical elements and the requirement for high installation precision;
a large optical system is required;
a coherent light source, such as a laser light source, is required; and
the techniques are susceptible to recording environments (e.g., vibration and temperature change).

Non-Patent Literature 2 discloses a technique for obtaining complex amplitude information on the basis of the intensity information obtained by a multiple-shot recording without using light interference. FIG. 30 shows a measurement apparatus for use in such a technique.

In the measurement apparatus 60 shown in FIG. 30, the light emitted from a light source 61 illuminates the measurement object 100 through an objective lens 62, lens 63, and mirror 64, and the light that has been reflected from the measurement object 100 enters a camera 65. The camera 65 is provided on a fine movement stage 70, which moves along the propagation direction of the reflected light. Recording the measurement object 100 with a multiple-shot exposure using the camera 65, while moving the fine movement stage 70, captures multiple sets of intensity information recorded at different optical distances (optical path length) from the measurement object 100. Moreover, the phase information of the measurement object 100 is calculated from the change in intensity information using the transport of intensity equation (TIE). This makes it possible to determine the complex amplitude information of the measurement object 100.

The measurement apparatus 60 is more advantageous than the holography apparatus 50 shown in FIG. 29 in the following respects:
the optical system is simple;
the measurement apparatus 60 is not susceptible to recording environments (e.g., vibration) because light interference is not used; and
a self-illuminating object (e.g., a fluorescent object) can be measured because a coherent light source is unnecessary.

Such a measurement technique is used in the field of electronic microscopes, for example. An electronic microscope using such a technique measures the intensity of electron waves in a plurality of observed planes to determine the phase so as to meet the law of electron wave propagation.

CITATION LIST

Patent Literature

Patent Literature 1: U.S. Pat. No. 4,294,526

Non-Patent Literature

Non-Patent Literature 1: J. W. Goodman et al., "Digital Image Formation from Electronically Detected Holograms," Appl. Phys. Lett., vol. 11, pp. 77-79, 1967
Non-Patent Literature 2: M. R. Teague, "Deterministic Phase Retrieval: A Green's Function Solution," J. Opt. Soc. Am., vol. 73, issue No. 11, pp. 1434-1441, 1983

SUMMARY OF INVENTION

Technical Problem

The measurement apparatus 60 shown in FIG. 30 requires multiple-shot recording to obtain the phase information of the measurement object 100. It is thus impossible to obtain complex amplitude information of an object that instantaneously moves or deforms. In actuality, the measurement apparatus 60 has been used to observe a stationary object showing almost no shape change.

The present invention was made to solve this problem. An object of the present invention is to provide a measurement apparatus that obtains complex amplitude information (intensity information and phase information) of an object, for example, a moving or deforming object.

Solution to Problem

The complex amplitude information measurement apparatus according to the present invention was completed to solve the above-described problem, and the apparatus comprises: pixel sensor groups for generating a difference from one pixel sensor group to another in the optical distance of the object light traveling from a measurement object; an image sensor for recording, with a single-shot exposure, the object light that has passed through or been reflected from the pixel sensor groups to obtain, at a time, intensity information recorded at different optical distances from the measurement object; and a phase information computing unit for computing, on the basis of the intensity information, phase information of the measurement object.

The complex amplitude information measurement apparatus configured as such can obtain, with a single-shot exposure, data corresponding to multiple sets of intensity information recorded at different optical distances because of the pixel sensor groups positioned at different optical distances from the measurement object. The data are applied to, for example, the transport of intensity equation to compute phase information, and then the complex amplitude information of the measurement object can be determined. Unlike conventional measurement apparatuses, this apparatus does not require a multiple-shot recording, and thus can determine the complex amplitude information of an object that is moving or deforming.

The measurement apparatus may have a structure in which the phase information computing unit comprises:
an extraction section for extracting, on the basis of the intensity information, pixels obtained by recording the object light that has passed through or been reflected from the pixel sensor groups to thereby generate extracted data corresponding to the respective pixel sensor groups;
an interpolation section for interpolating the extracted data to generate the respective interpolated data; and a calculation section for obtaining the phase information from each of the interpolated data.

The measurement apparatus may have a structure in which the phase information computing unit comprises a calculation section for obtaining the phase information from a combination of any pixels included in the intensity information.

The measurement apparatus may have a structure in which the calculation section obtains the phase information on the basis of the transport of intensity equation.

The measurement apparatus may have a structure in which the calculation section obtains the phase information on the basis of Fourier transformation.

The measurement apparatus may have a structure in which the pixel sensor groups differ from one another in spatial distance from the measurement object.

The measurement apparatus may comprise,
between the measurement object and the image plane of the image sensor, a polarizer for converting object light from the measurement object into linearly polarized light;
a wave plate having a refractive index that varies with a vibration direction of light incident thereon, the wave plate being for separating light that has been transmitted through the polarizer into linearly polarized light components that are perpendicular to each other; and
a micro-polarizer array including first regions that allow only a slow axis component of the linearly polarized light components to be transmitted therethrough and second regions that allow only a fast axis component of the linearly polarized light components to be transmitted therethrough,
wherein the plurality of pixel sensor groups consist of a first pixel sensor group and a second pixel sensor group; and the first regions overlap with pixel sensors constituting the first pixel sensor group; and the second regions overlap with pixel sensors constituting the second pixel sensor group.

The measurement apparatus may comprise, between the measurement object and the image plane of the image sensor, an array including a plurality of regions that differ in refractive index, wherein the plurality of regions overlap with the respective pixel sensor groups.

The measurement apparatus may have a structure in which, of the plurality of regions, regions having the lowest refractive index are vacant regions.

The measurement apparatus may have a structure in which the object light is linearly polarized light, the apparatus comprising, between the measurement object and the image plane of the image sensor,
a wave plate having a refractive index that varies with a vibration direction of light incident thereon, the wave plate being for separating the linearly polarized light into linearly polarized light components that are perpendicular to each other; and
a micro-polarizer array including first regions that allow only a slow axis component of the linearly polarized light components to be transmitted therethrough and second regions that allow only a fast axis component of the linearly polarized light components to be transmitted therethrough,
wherein the pixel sensor groups consist of a first pixel sensor group and a second pixel sensor group; and the first regions overlap with pixel sensors constituting the first pixel sensor group; and the second regions overlap with pixel sensors constituting the second pixel sensor group.

The measurement apparatus may comprise, between the measurement object and the image plane of the image sensor,
a polarizer for converting object light from the measurement object into linearly polarized light; and
a wave plate including first regions and second regions,
the first regions having a refractive index that varies with a vibration direction of light incident thereon, such that a linearly polarized light component in a first vibration direction experiences the highest refractive index,
the second regions having a refractive index that varies with a vibration direction of light incident thereon, such that a linearly polarized light component in a second vibration direction, which is different from the first vibration direction, experiences the highest refractive index,
wherein the pixel sensor groups consist of a first pixel sensor group and a second pixel sensor group; and the first regions overlap with pixel sensors constituting the first pixel sensor group; and the second regions overlap with pixel sensors constituting the second pixel sensor group.

The measurement apparatus may have a structure in which the object light is linearly polarized light, the apparatus comprising, between the measurement object and the image plane of the image sensor, a wave plate array including first wave plates and second wave plates,
the first wave plates having a refractive index that varies with a vibration direction of light incident thereon, such that a linearly polarized light component in a first vibration direction experiences the highest refractive index, the second wave plates having a refractive index that varies with a vibration direction of light incident thereon, such that a linearly polarized light component in a second vibration direction, which is different from the first vibration direction, experiences the highest refractive index, wherein the pixel sensor groups consist of a first pixel sensor group and a second pixel sensor group; and the first wave plates overlap with pixel sensors constituting the first pixel sensor group; and the second wave plates overlap with pixel sensors constituting the second pixel sensor group.

Advantageous Effects of Invention

The present invention can provide a measurement apparatus that obtains complex amplitude information of, for example, a moving or deforming object.

BRIEF DESCRIPTION OF DRAWINGS

FIG. 5 is intensity information of a measurement object recorded by the image sensor with a single-shot exposure.

FIG. 6(a) is extracted data corresponding to the first pixel sensor group, and FIG. 6(b) is extracted data corresponding to the second pixel sensor group.

FIG. 7(a) is interpolated data corresponding to the first pixel sensor group, and FIG. 7(b) is interpolated data corresponding to the second pixel sensor group.

FIG. 8 describes the computation using the transport of intensity equation.

FIGS. 14(a) and 14 (b), respectively, are a top view and a cross-sectional view of an array having a plurality of refractive indices according to Variation Example 3.

FIG. 16 is intensity information of a measurement object obtained with a single-shot exposure by the image sensor shown in FIG. 15.

FIGS. 17(a) to 17(c), respectively, are extracted data corresponding to the first to third pixel sensor groups.

FIGS. 18(a) to 18(c), respectively, are interpolated data corresponding to the first to third pixel sensor groups.

FIG. 19 describes the computation using the transport of intensity equation.

DESCRIPTION OF EMBODIMENTS

Embodiment 1

The following describes Embodiment 1 of the present invention with reference to the attached drawings.

Measurement Apparatus Structure

Figure 1:
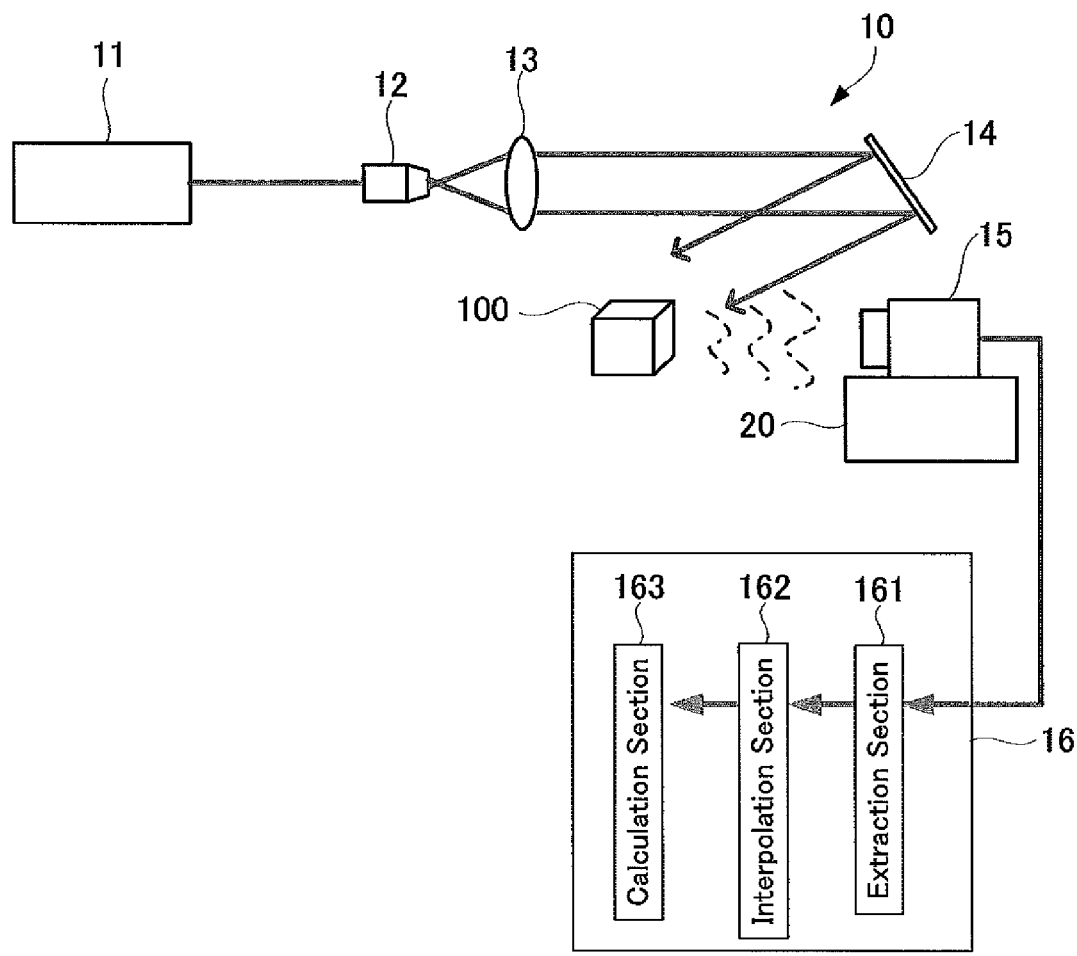
FIG. 1 is a block diagram of the structure of a complex amplitude information measurement apparatus according to Embodiment 1 of the present invention.

FIG. 1 is a block diagram showing the structure of a complex amplitude information measurement apparatus 10 according to Embodiment 1. The measurement apparatus 10 comprises a light source 11, an objective lens 12, a lens 13, a mirror 14, a camera 15, and a computer (phase information computing unit) 16.

The light source 11 emits non-coherent light. The light emitted from the light source 11 illuminates the measurement object 100 through the objective lens 12, the lens 13, and the mirror 14, and the light that is reflected from the measurement object 100 (object light) enters the camera 15. Known products may be used as the objective lens 12, lens 13, and mirror 14.

When the measurement object 100 is a self-illuminating object, the light source 11, objective lens 12, lens 13, and mirror 14 are unnecessary. The light source 11 may emit coherent light.

Figure 30:
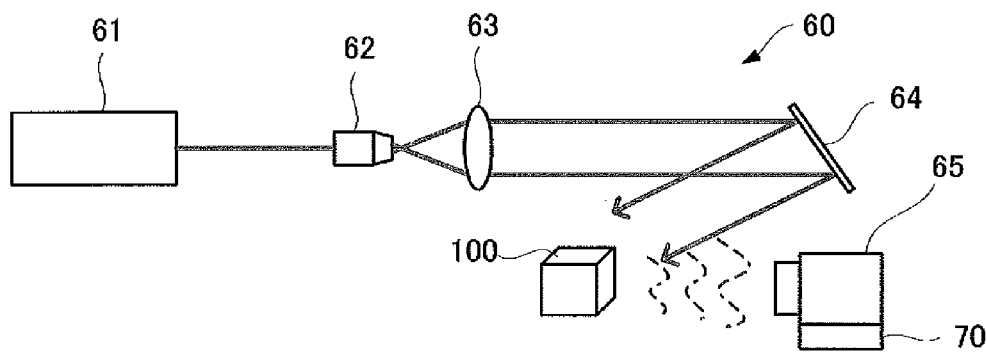
FIG. 30 is a block diagram showing the structure of a conventional complex amplitude information measurement apparatus.

The camera 15, unlike the conventional measurement apparatus 60 shown in FIG. 30, is installed on a stationary stage 20. The camera 15 is connected to the computer 16, and the computer 16 can determine the phase information of the measurement object 100, by a computation based on the transport of intensity equation, from the intensity information (luminance information, brightness information) of the measurement object 100 that has been obtained by the camera 15. The computer 16 may be built into the camera 15.

The camera 15 comprises a plurality of pixel sensor groups for generating a difference from one pixel sensor group to another in the optical distance (optical path length) of the object light from the measurement object 100, and an image sensor that records with a single-shot exposure the object light that has passed through or been reflected from the pixel sensor groups to obtain intensity information recorded at different optical distances (optical path lengths) from the measurement object 100.

An example of this structure will be described with reference to FIGS. 2 to 4.

Image Sensor Structure

Figure 2:
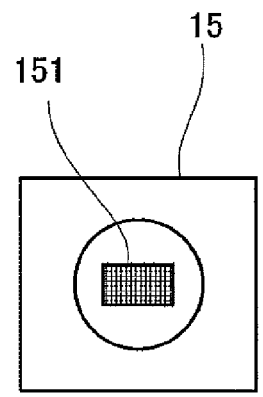
FIG. 2 is a front view of a camera.

FIG. 2 shows a front view of the camera 15. As shown in FIG. 2, the camera 15 is provided with an image sensor 151 on its light-receiving face and a plurality of pixel sensors arrayed on the image sensor 151.

Figure 3:
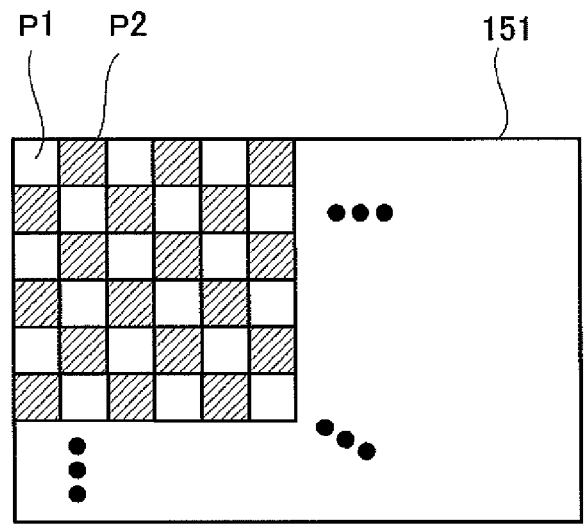
FIG. 3 is an enlarged top view of an image sensor.

FIG. 3 shows an enlarged top (plane) view of the image sensor 151. The pixel sensors on the image sensor 151 consist of two groups of pixel sensors, the first pixel sensor group and the second pixel sensor group. Pixels P1 shown as white squares constitute the first pixel sensor group whereas pixel sensors P2 shown as shaded squares constitute the second pixel sensor group. Specifically, in FIG. 3, only pixel sensors P2 constituting the second pixel sensor group are shaded, and pixel sensors P1 and pixel sensors P2 are alternately arrayed in the lengthwise and crosswise directions of the image sensor 151.

Moreover, the first pixel sensor group and the second pixel sensor group differ from each other in the optical distance from the measurement object 100. In other words, the optical path length between the measurement object 100 and each pixel sensor P1 is different from the optical path length between the measurement object 100 and each pixel sensor P2. Pixel sensors P1 have the same optical distance from the measurement object 100 to one another, and pixel sensors P2 have the same optical distance from the measurement object 100 to one another.

Figure 4:
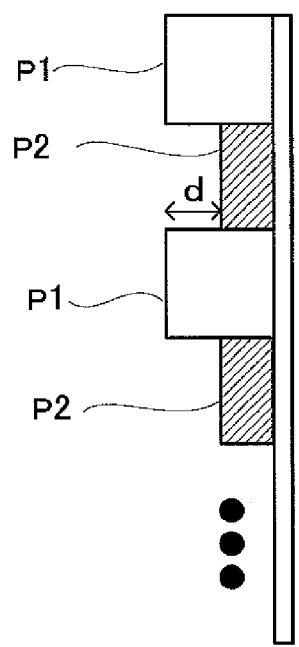
FIG. 4 is a cross-sectional view of part of the image sensor.

FIG. 4 is a cross-sectional view showing part of the image sensor 151. The measurement object 100 is assumed to be positioned on the left side of FIG. 4. There is a difference in height by distance d between pixel sensors P1 and pixel sensors P2. The protruding portion of each pixel sensor P1 is composed of a material through which light passes at a speed different from the speed at which light passes through air. Thus, light takes a different amount of time to be transmitted through pixel sensors P1 from the amount of time to be transmitted through pixel sensors P2. In other words, pixel sensors P1 differ from pixel sensors P2 in the equivalent spatial distance from the measurement object 100; i.e., pixel sensors P1 differ from pixel sensors P2 in the optical distance from the measurement object 100. Thus, the optical distance from the measurement object 100 to the first pixel sensor group can be made to differ from the optical distance from the measurement object 100 to the second pixel sensor group. Although the protruding portions are provided to the image sensor in this embodiment, it is also possible to configure an array sensor that has an uneven surface to which flat pixel sensors of a image sensor can be applied.

As described above, the camera 15 comprises two pixel sensor groups that differ from each other in the optical distance from the measurement object 100. This enables the simultaneous acquisition of two images that differ from each other in optical distance with only a single-shot exposure, and enables the computer 16 to compute the phase information of the measurement object 100 from two sets of intensity information for the measurement object 100. The following describes the processing executed by the computer 16.

Computer Processing

The computer 16 processes image data recorded by the image sensor 151 of the camera 15, and can be configured using a general-purpose computer. As shown in FIG. 1, the computer 16 comprises an extraction section 161, an interpolation section 162, and a calculation section 163. Each section is a functional block that is operated by executing a program with the computer 16. Each section may also be configured using hardware.

FIG. 5 shows intensity information for the measurement object 100 obtained in a single-shot exposure with the image sensor 151. The pixels constituting the intensity information correspond to the respective pixel sensors of the image sensor 151. Pixels B1 recorded by the first pixel sensor group P1 and pixels B2 recorded by the second pixel sensor group P2 are indicated by different patterns.

The intensity information is sent from the camera 15 to the computer 16, and the extraction section 161 of the computer 16 generates data (extracted data D1a) including only pixels 1E extracted from the intensity information and data (extracted data D2a) including only pixels B2 extracted from the intensity information. FIGS. 6(a) and 6(b) show extracted data D1a and extracted data D2a, respectively.

Subsequently, the interpolation section 162 of the computer 16 interpolates the data gap (shown as white squares in FIGS. 6(a) and 6(b)) of extracted data D1a and D2a to thereby generate interpolated data D1b and D2b. FIGS. 7(a) and 7(b) show interpolated data D1b and interpolated data D2b, respectively. The interpolation can be performed using, for example, a calculation based on the pixels near the gap.

The interpolated data D1b is generated from the intensity information obtained by the first pixel sensor group. Thus, the interpolated data D1b approximates the intensity information of the measurement object 100 obtained via the optical distance between the first pixel sensor group and the measurement object 100 by an image sensor having a flat image plane. Likewise, the interpolated data D2b, which is generated from the intensity information obtained by the second pixel sensor group, approximates the intensity information of the measurement object 100 obtained via the optical distance between the second pixel sensor group and the measurement object 100 by an image sensor having a flat image plane. In this manner, data corresponding to two sets of intensity information recorded at different optical distances from the measurement object 100 can be obtained with a single-shot exposure.

Subsequently, the calculation section 163 of the computer 16 computes phase information for the measurement object 100 from the interpolated data D1b and D2b in accordance with the transport of intensity equation (TIE). This enables the measurement apparatus 10 of this embodiment to determine the complex amplitude information of the measurement object 100.

As described in Background Art, the conventional measurement apparatus 60 shown in FIG. 30 also computes phase information of the measurement object 100 from multiple sets of intensity information recorded at different optical distances from the measurement object 100 in accordance with the transport of intensity equation. However, to obtain multiple sets of intensity information recorded at different optical distances, it is necessary in the measurement apparatus 60 to record the measurement object 100 with a multiple-shot exposure while moving the camera 65. It is thus impossible to obtain complex amplitude information of a moving object, a deforming object, and the like using the measurement apparatus 60.

In contrast, the measurement apparatus 10 of this embodiment can obtain data corresponding to multiple sets of intensity information of the measurement object 100 that are recorded at different optical distances with a single-shot exposure, and can determine complex amplitude information for the measurement object 100 with a single-shot exposure. Accordingly, the measurement apparatus 10 can be used to determine the complex amplitude information of a moving object, a deforming object, and the like.

Computation Based on the Transport of Intensity Equation

The following describes the transport of intensity equation. The transport of intensity equation concerns the propagation of intensity as shown in the following equation (1).

$$\nabla \cdot \{I_z(x, y) \nabla \phi_z(x, y)\} = -k \frac{\partial I_z(x, y)}{\partial z} \quad (1)$$

$I_z(x, y)$ represents the intensity distribution (intensity information) of the object light, and the $\phi_z(x, y)$ represents the phase distribution (phase information) of the object light. In the equation, $k=2\pi/\lambda$, and the symbol "$\lambda$" represents a wavelength. The symbol "$\nabla$" represents a two-dimensional vector differential operator in an xy table. When the intensity of the object light and the differential value of the wave in the propagation direction at the measured plane are known, the phase at the measured plane can be determined from this differential equation.

To apply the transport of intensity equation, the intensity of the object (at a measured plane) and the differential value of object light in the propagation direction are necessary. The differential value can be obtained approximately from the difference in object light beams at measured planes that are each at a different optical distance from the measurement object.

The following explains the differential in the right side of the transport of intensity equation.

As shown in FIG. 8, the following values are determined: the intensity $I(x,y,z_0)$ at the coordinate $(0,0,z)$ of a measured plane 1 of the measurement object and the intensity $I(x,y,z_0+d)$ at the coordinate $(0,0,z+d)$ of a measured plane 2 of the same measurement object. The interpolated data D1$b$ shown in FIG. 7($a$) approximates the intensity $I(x,y,z_0)$, and the interpolated data D2$b$ approximates the intensity $I(x,y,z_0+d)$.

Taylor expansion of intensity $I(x,y,z_0+d)$ gives the following equation (2).

$$I(x, y, z_0 + d) = I(x, y, z_0) + \frac{\partial I}{\partial z}(d) + \frac{\partial^2 I}{\partial z^2} \frac{d^2}{2!} + O[(d)^3] + \ldots \quad (2)$$

As shown in equation (3) below, the intensity differential of the measured plane 1 approximates the intensity difference between the measured plane 1 and the measured plane 2.

$$\frac{\partial I}{\partial z} \approx \frac{I(x, y, z_0 + d) - I(x, y, z_0)}{d} \quad (3)$$

As described above, when $I(x,y,z_0)$ and the differential $\partial I/\partial z$ are known, the phase information of the measurement object can be computed using the transport of intensity equation. This enables the measurement of the complex amplitude of the measurement object.

Variation Example of Image Sensor

As shown in FIG. 4, there is a difference in height between pixel sensors P1 and pixel sensors P2 of the image sensor 151, and thus there is a difference in spatial distance from the measurement object to pixel sensors P1 and pixel sensors P2. Accordingly, there is a difference in optical distance from the measurement object to the first pixel sensor group and the second pixel sensor group. The following describes a variation example of image sensors provided with pixel sensors configured to be all at the same spatial distance from the measurement object, i.e., an image sensor having a flat image plane.

Variation Example 1

Figure 9:
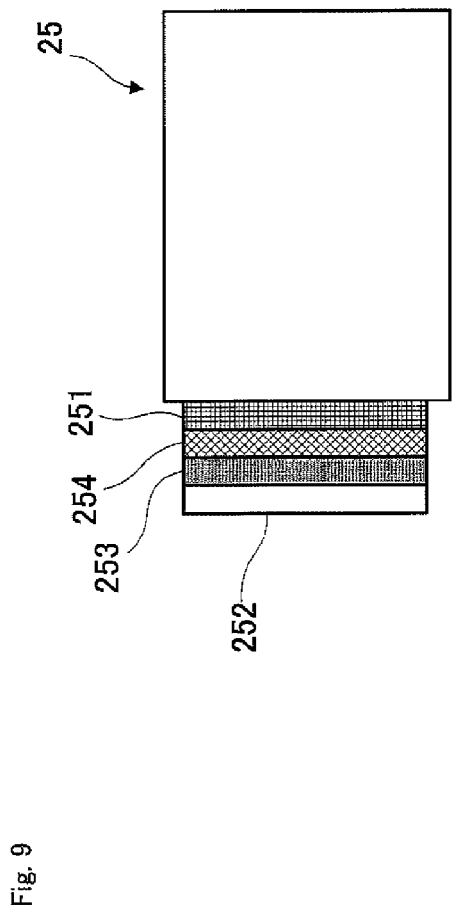
FIG. 9 is a cross-sectional view of the structure of a camera according to Variation Example 1 of Embodiment 1 of the present invention.

FIG. 9 is a cross-sectional view showing the structure of a camera 25 according to Variation Example 1 of this embodiment. The camera 25 comprises an image sensor 251, a polarizer 252, a wave plate 253, and a micro-polarizer array 254.

The image sensor 251 has a flat image plane. In other words, when the polarizer 252, the wave plate 253, and the micro-polarizer array 254 are not provided, pixel sensors of the image sensor 251 are all at the same spatial distance from the measurement object.

The polarizer 252, the wave plate 253, and the micro-polarizer array 254 are stacked on the image sensor 251; i.e., the polarizer 252, the wave plate 253, and the micro-polarizer array 254 are sequentially disposed in the propagation direction of the light (object light) from the measurement object.

Figure 10:
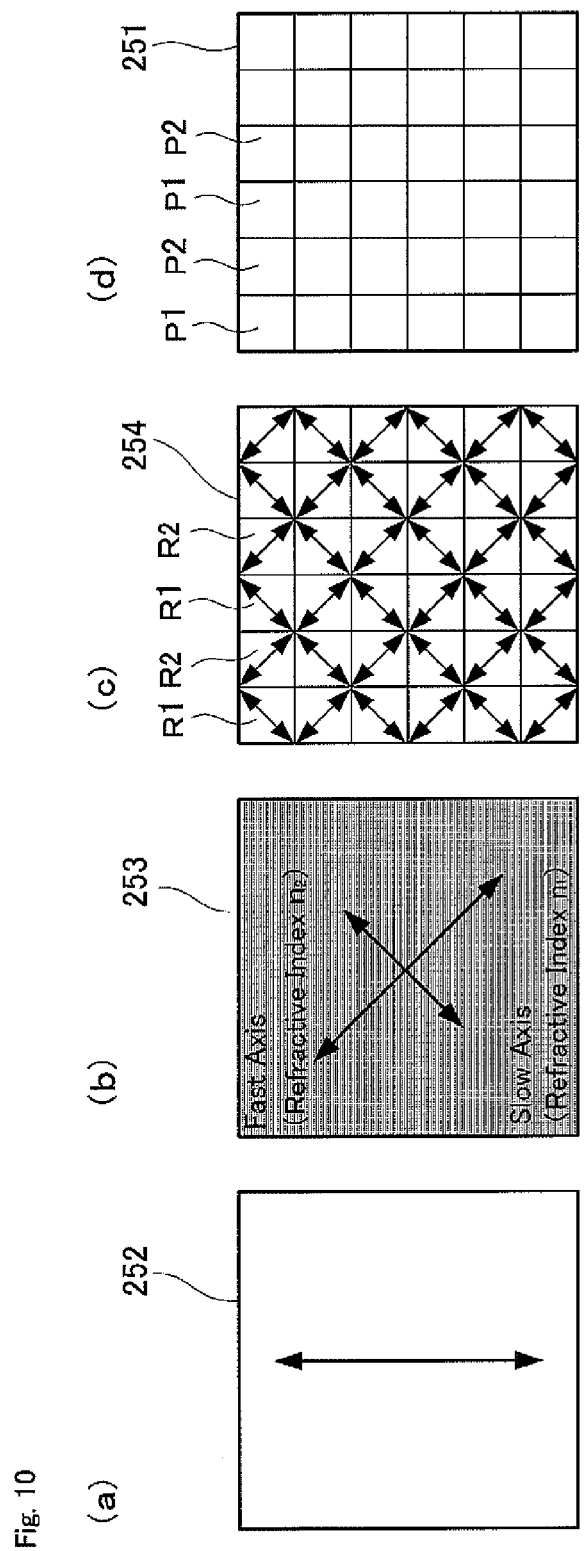
FIGS. 10(a) to 10(d), respectively, are top views of a polarizer, a wave plate, a micro-polarizer array, and an image sensor.

FIGS. 10($a$) to 10($d$) show top views of the polarizer 252, the wave plate 253, the micro-polarizer array 254, and the image sensor 251, respectively. The polarizer 252 is a device for converting object light to linearly polarized light. The wave plate 253 is a device having a refractive index that varies with the vibration direction of light that has been transmitted through the polarizer 252. The refractive index of the slow axis component is denoted by $n_1$, and the refractive index of the fast axis component is denoted by $n_2$ ($n_1 > n_2$). Thus, linearly polarized light incident on the wave plate 253 is separated into linearly polarized light components that are perpendicular to each other.

The micro-polarizer array 254 is a polarization filter including regions R1 that allow only the slow axis component to be transmitted, and regions R2 that allow only the fast axis component to be transmitted. The regions R1 and the regions R2 are alternately disposed in the lengthwise and crosswise directions of the micro-polarizer array 254. The regions R1 overlap with pixel sensors P1 constituting the first pixel sensor group of the image sensor 251, whereas regions R2 overlap with pixel sensors P2 constituting the second pixel sensor group of the image sensor 251. Thus, only the slow axis component enters the first pixel sensor group, and only the fast axis component enters the second pixel sensor group.

Because the refractive index of the wave plate 253 differs between the slow axis component and the fast axis component as described above, the light speed also differs between the slow axis component and the fast axis component. This is why the optical distance from the measurement object differs between the first pixel sensor group and the second pixel sensor group, despite the flat shape of the image plane of the image sensor 251.

As described above, because the polarizer 252, the wave plate 253, and the micro-polarizer array 254 are overlaid on the flat image plane of the image sensor 251 in Variation Example 1, the first pixel sensor group and the second pixel sensor group can be made to differ from each other in the optical distance from the measurement object. Image data recorded by the camera 25 is processed by the computer 16 shown in FIG. 1 in accordance with the procedure described in FIGS. 5 to 7. Thus, data corresponding to two different sets of intensity information recorded at different optical distances from the measurement object are obtained in a one-shot exposure. This also enables the use of a typical image sensor having a flat image plane.

It is not necessary to overlay the polarizer 252, the wave plate 253, and the micro-polarizer array 254, as long as they are provided between the measurement object and the image sensor 251.

Variation Example 2

Figure 11:
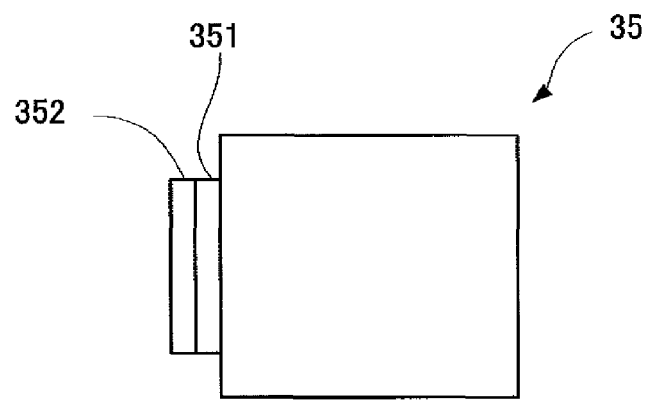
FIG. 11 is a cross-sectional view of the structure of a camera according to Variation Example 2 of Embodiment 1 of the present invention.

FIG. 11 is a cross-sectional view showing the structure of the camera 35 according to Variation Example 2 of this embodiment. The camera 35 comprises an image sensor 351 and an array 352 having a plurality of refractive indices.

The image sensor 351 has the same structure as the image sensor 251 according to Variation Example 1 described above. Specifically, pixel sensors of the image sensor 351 are all at the same spatial distance from the measurement object.

Figure 12:
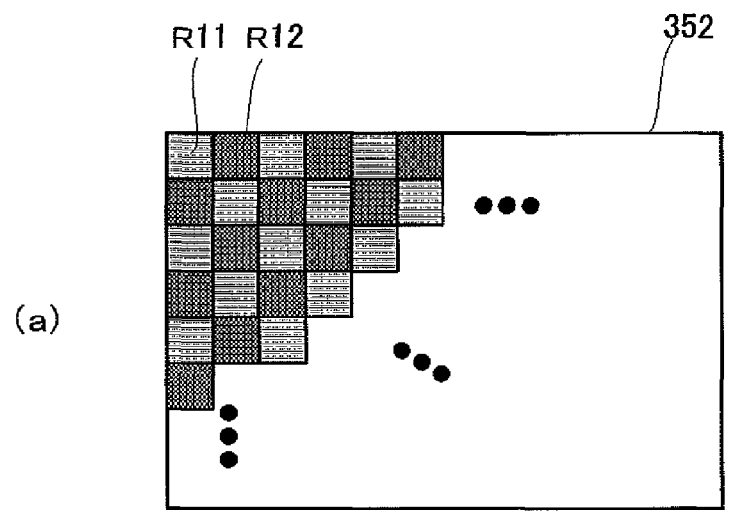
FIGS. 12(a) and 12(b), respectively, are a top view and a cross-sectional view of an array having a plurality of refractive indices according to Variation Example 2.
Figure 12:
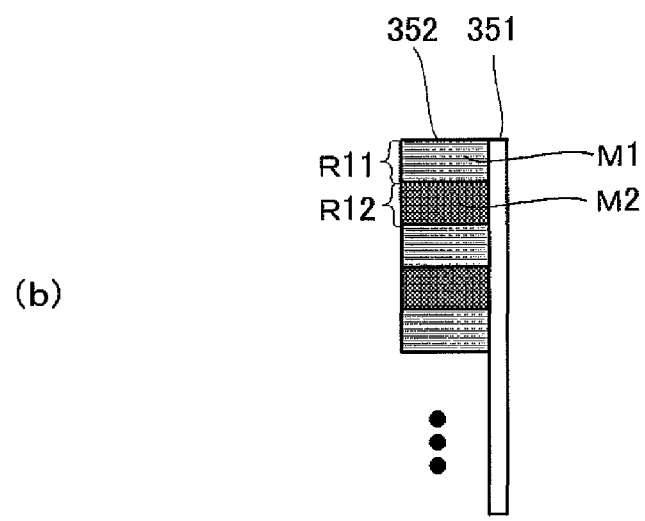

FIGS. 12(a) and 12(b), respectively, show a top view and a cross-sectional view of the array 352. As shown in FIG. 12(a), the array 352 includes, in the planar direction, two regions R11 and R12 each having a different refractive index, and the regions R11 and the regions R12 are alternately disposed in the lengthwise and crosswise directions of the array 352.

As shown in FIG. 12(b), the regions R11 are composed of an optical medium M1 with a refractive index $n_1$, and the regions R12 are composed of an optical medium M2 with a refractive index $n_2$ ($n_3 > n_2$). Thus, the optical medium M1 is the same as the optical medium M2 in terms of thickness in the propagation direction of object light; however, since light is transmitted through the regions R11 at a slower speed than through the regions R12, the optical distance of the light that is transmitted through the regions R11 is longer than the optical distance of the light that is transmitted through the regions R12.

The regions R11 overlap with the pixel sensors constituting the first pixel sensor group of the image sensor 351, whereas the regions R12 overlap with the pixel sensors constituting the second pixel sensor group of the image sensor 351. This is why the optical distance from the measurement object differs between the first pixel sensor group and the second pixel sensor group of the image sensor 351.

As described above, it is possible also in Variation Example 2 to generate a difference in optical distance from the measurement object between the first pixel sensor group and the second pixel sensor group by overlaying the array 352 on the flat image plane of the image sensor 351. The array 352 and the image sensor 351 may also be spaced from each other.

Variation Example 3

Figure 13:
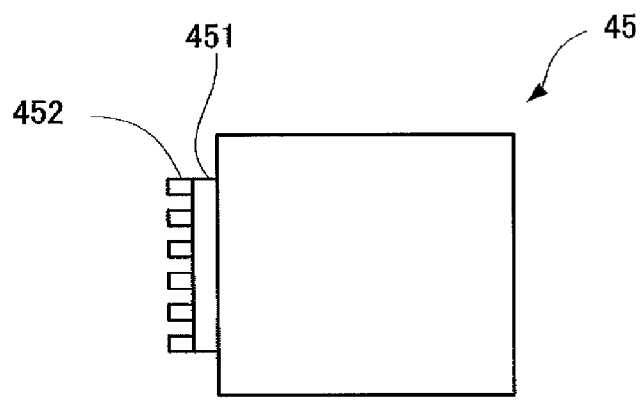
FIG. 13 is a cross-sectional view of the structure of a camera according to Variation Example 3 of Embodiment 1 of the present invention.

FIG. 13 is a cross-sectional view showing the structure of the camera 45 according to Variation Example 3 of this embodiment. The camera 45 comprises the image sensor 451 and an array 452 having a plurality of refractive indices.

The image sensor 451 has the same structure as the image sensor 251 according to Variation Example 1 or the image sensor 351 according to Variation Example 2. Specifically, the pixel sensors of the image sensor 451 are all at the same spatial distance from the measurement object.

Figure 14:
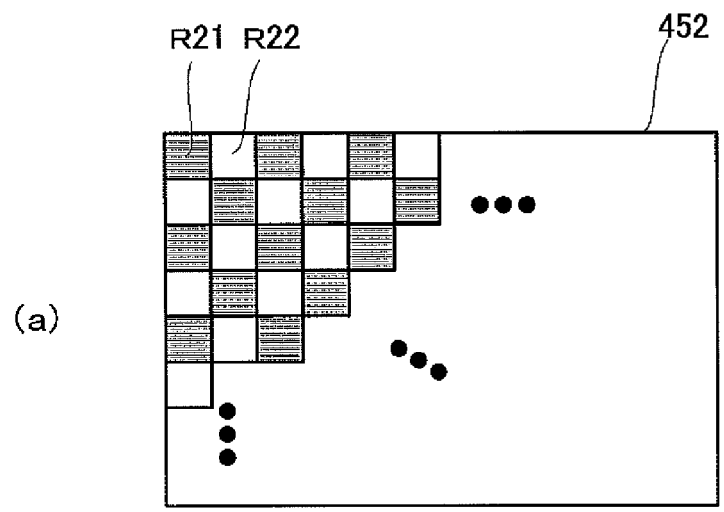
Figure 14:
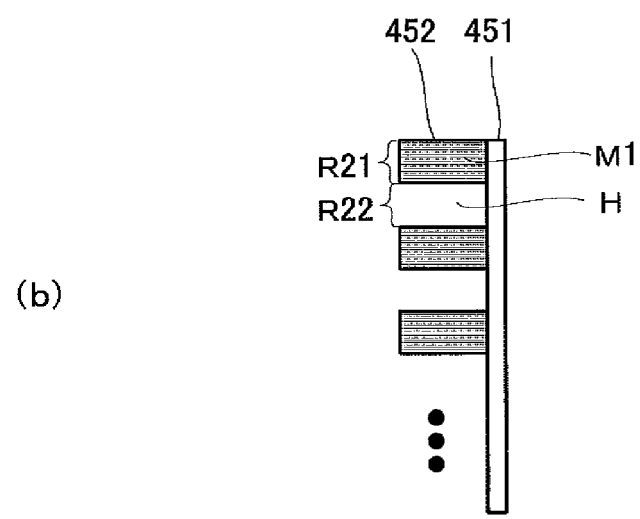

FIGS. 14(a) and 14(b), respectively, are a top view and a cross-sectional view of the array 452. As shown in FIG. 14(a), the array 452 includes regions R21 and regions R22 that are alternately disposed in the lengthwise and crosswise directions. As shown in FIG. 14(b), the regions R21 are composed of an optical medium M1 with a refractive index $n_1$ ($n_1 > 1$), whereas the regions R22 are vacant regions H. Thus, the regions R21 have a longer optical distance than the regions R22.

The regions R21 overlap with the pixel sensors constituting the first pixel sensor group of the image sensor 451, whereas the regions R22 overlap with the pixel sensors constituting the second pixel sensor group of the image sensor 451. Thus, the first pixel sensor group and the second pixel sensor group of the image sensor 451 differ from each other in the optical distance from the measurement object.

As described above, Variation Example 3 has the structure of Variation Example 2 except that the regions with the lowest refractive index of the array having a plurality of refractive indices are replaced by vacant regions H. It is also possible in Variation Example 3 to generate a difference in optical distance from the measurement object between the first pixel sensor group and the second pixel sensor group by overlaying the array 452 on the flat image plane of the image sensor 451.

Although the image sensors in Variation Examples 1 to 3 have a flat image plane, an image sensor for use may have pixel sensors that differ in height.

Variation Example 4

Figure 31:
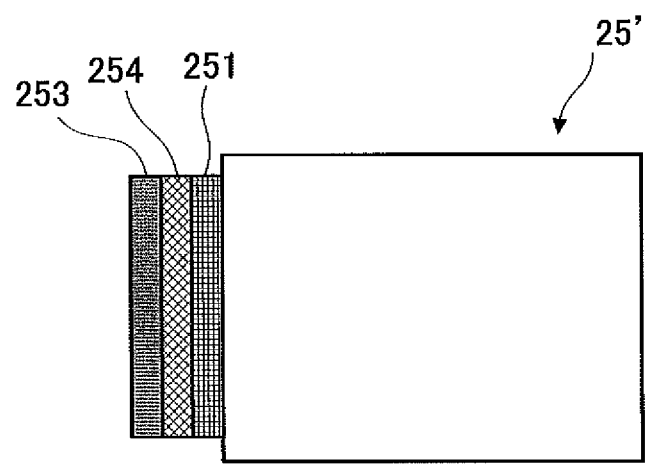
FIG. 31 is a cross-sectional view of the structure of a camera according to Variation Example 4 of Embodiment 1 of the present invention.

FIG. 31 is a cross-sectional view showing the structure of the camera 25' according to Variation Example 4 of this embodiment. The camera 25' comprises an image sensor 251, a wave plate 253, and a micro-polarizer array 254. Specifically, the camera 25' is configured as the camera 25 shown in FIG. 9, from which, however, the polarizer 252 is omitted. The image sensor 251., the wave plate 253, and the micro-polarizer array 254 are the same as those shown in FIGS. 10(b) to 10(d).

Because of the absence of a polarizer, the camera 25' can be used in the cases where the object light from the measurement object is linearly polarized light (e.g., when the light source 11 shown in FIG. 1 is a laser light source). The linearly polarized light is separated into linearly polarized light components that are perpendicular to each other by the wave plate 253, and transmitted through the micro-polarizer array 254 so that only the slow axis component enters the first pixel sensor group and only the fast axis component enters the second pixel sensor group. Because the refractive index of the wave plate 253 differs between the slow axis component and the fast axis component, the optical distance from the measurement object differs between the first pixel sensor group and the second pixel sensor group.

Variation Example 5

Figure 32:
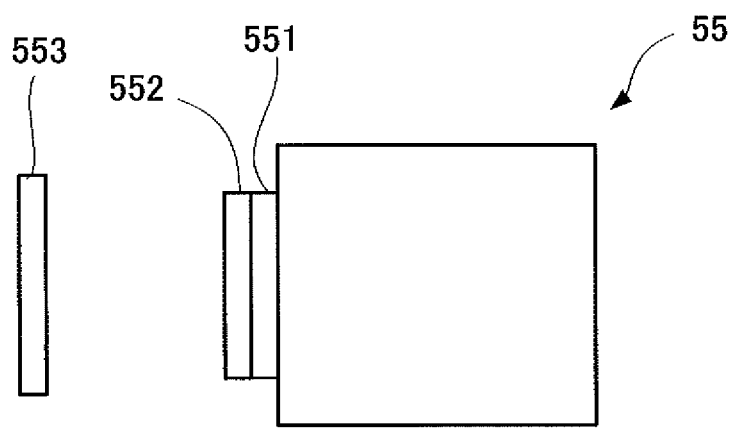
FIG. 32 is a cross-sectional view of the structure of a camera according to Variation Example 5 of Embodiment 1 of the present invention.

FIG. 32 is a cross-sectional view showing the structure of the camera 55 according to Variation Example 5 of this embodiment. The camera 55 comprises an image sensor 551, a wave plate array 552, and a polarizer 553. The image sensor 551 has the same structure as the image sensor 251 according to Variation Example 1.

Figure 33:
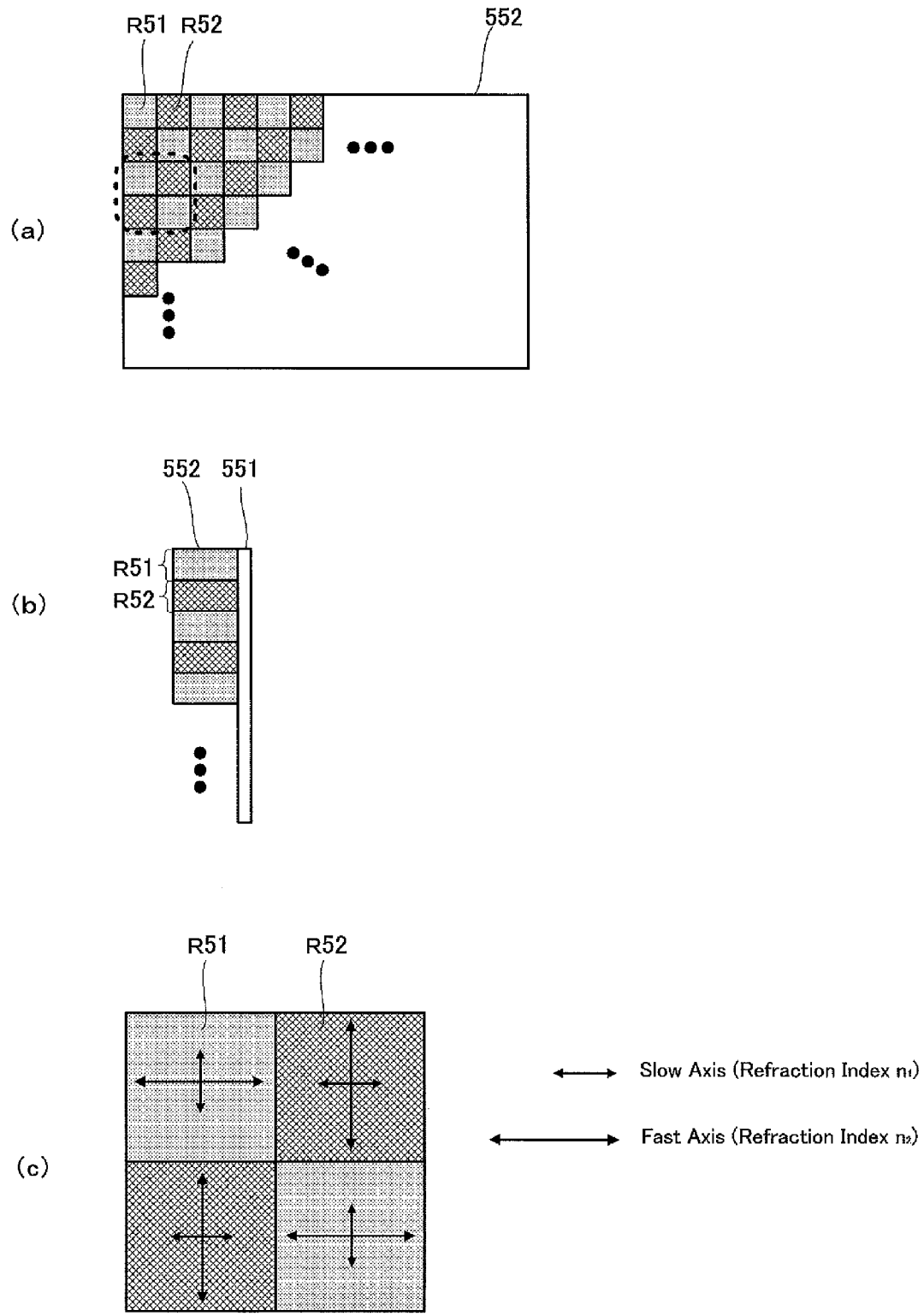
FIGS. 33 (a), 33 (b) and 33 (c), respectively, are a top view, a cross-sectional view, and an enlarged top view of a wave plate array of the camera shown in FIG. 32.

FIGS. 33(a) and 33(b), respectively, show a top view and a cross-sectional view of the wave plate array 552. FIG. 33(c) is an enlarged top view of the portion surrounded with a dashed line in FIG. 33(a). As shown in FIG. 33(a), the wave plate array 552 includes regions R51 and regions R52, and the regions 51 and regions 52 are alternately disposed in the lengthwise and crosswise directions of the wave plate array 552. As shown in FIG. 33(b), the regions R51 are the same as the regions R52 in terms of thickness in the propagation direction of object light.

The regions R51 and regions R52 are common in the following: the refractive index varies with the vibration direction of the light that enters the regions; the refractive index of the slow axis component is the highest ($n_1$); and the refractive index of the fast axis component is the lowest ($n_2$). However, as shown in FIG. 33(c), the direction of the fast axis of the regions R51 is perpendicular to the direction of the fast axis of the regions R52, and the direction of the slow axis of the regions RS1 is perpendicular to the direction of the slow axis of the regions R52. Specifically, in the regions R51, a linearly polarized light component in the crosswise direction of the wave plate array 552 (the first vibration direction) has the highest refractive index, and in the regions R52, a linearly polarized light component in the lengthwise direction of the wave plate array 552 (the second vibration direction) has the highest refractive index.

For example, when the vibration direction of object light that has been orthogonally polarized after being transmitted through the polarizer 553 is the lengthwise direction of the wave plate array 552, the optical distance of the light that has been transmitted through the regions R51 is longer than the optical distance of the light that has been transmitted through the regions R52.

The regions R51 overlap with the pixel sensors constituting the first pixel sensor group of the image sensor 551, and the regions R52 overlap with the pixel sensors constituting the second pixel sensor group of the image sensor 551. Thus, the first pixel sensor group and the second pixel sensor group of the image sensor 551 differ from each other in the optical distance from the measurement object.

As described above, it is also possible in Variation Example 5 to generate a difference in optical distance from the measurement object between the first pixel sensor group and the second pixel sensor group by overlaying the wave plate array 552 on the flat image plane of the image sensor 551. The wave plate array 552 and the image sensor 551 may be spaced from each other.

Figure 34:
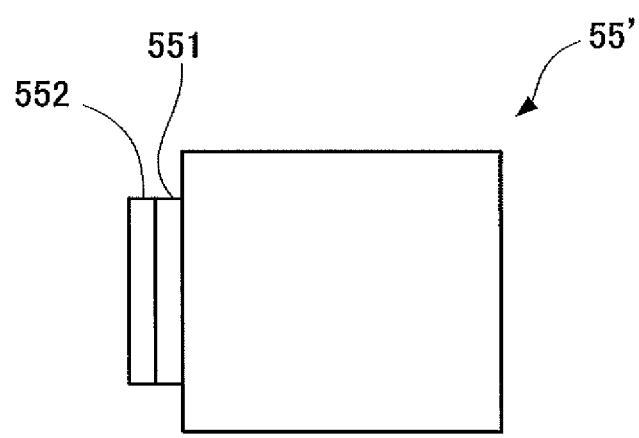
FIG. 34 is a cross-sectional view of another structure of the camera according to Variation Example 5 of Embodiment 1 of the present invention.

When the object light from the measurement object is linearly polarized light, the polarizer 553 can be omitted from the camera 55 as in the structure of camera 55' shown in FIG. 34. Specifically, the camera 55' comprises an image sensor 551 and a wave plate array 552, and the image sensor 551 has the same structure as the image sensor 251 according to Variation Example 1, with the wave plate array 552 having the same structure as that shown in FIG. 33.

Embodiment 2

Although Embodiment 1 has described a structure including two pixel sensor groups that differ from each other in terms of the optical distance of object light from the measurement object, the number of pixel sensor groups that differ from each other in terms of optical distance may be three or more. Embodiment 2 describes a structure in which three pixel sensor groups are provided.

Image Sensor Structure

FIGS. 15(a) and 15(b), respectively, show a top view and a cross-sectional view of the image sensor 152. As shown in FIG. 15(a), the pixel sensors on the image sensor 152 consist of the first pixel sensor group, the second pixel sensor group, and the third pixel sensor group. The pixel sensors constituting the first pixel sensor group are "pixel sensors P1," the pixel sensors constituting the second pixel sensor group are "pixel sensors P2," and the pixel sensors constituting the third pixel sensor group are "pixel sensors P3." The pixel sensors P1, P2, and P3 are disposed on the image plane of the image sensor 152 in substantially the same number of pixel sensors. The pixel sensors are disposed in the order of pixel sensor P1, pixel sensor P2, pixel sensor P3, pixel sensor P1, pixel sensor P2 . . . in the lengthwise and crosswise directions of the image sensor 152.

As shown in FIG. 15(b), a difference in height by distance d is provided between each pixel sensor P1 and each pixel sensor P2 as well as between each pixel sensor P2 and each pixel sensor P3, and a difference in height by distance 2d is provided between each pixel sensor P1 and each pixel sensor P3. Making a difference in the spatial distance from the measurement object to pixel sensors P1, P2, and P3 can make a difference in the optical distance from the measurement object to the first to third pixel sensor groups.

Computation by Computer

FIG. 16 shows intensity information of the measurement object recorded with the image sensor 152 with a single-shot exposure. Each pixel constituting the intensity information corresponds to each pixel sensor of the image sensor 152, and the pixels B11 recorded by the first pixel sensor group, the pixels B12 recorded by the second pixel sensor group, the pixels B13 recorded by the third pixel sensor group are shown in different patterns. The intensity information is processed by a computer to thereby generate data by extracting only pixels B11 (extracted data D11a), data by extracting only pixels B12 (extracted data D12a), and data by extracting only pixels B13 (extracted data D13a). FIGS. 17(a) to 17(c), respectively, show extracted data D11a, extracted data D12a, and extracted data D13a.

Subsequently, the extracted data D11a, D12a, and D13a are interpolated to generate interpolated data D1b, D12b, and D13b. FIGS. 18(a) to 18(c), respectively, show interpolated data D11b, D12b, and D13b.

The interpolated data D11b are generated from the intensity information recorded by the first pixel sensor group, and thus the interpolated data D11b approximates the intensity information of the measurement object recorded by the image sensor having a flat imaging plane via the optical distance from the measurement object to the first pixel sensor group. Likewise, the interpolated data D12b approximates the intensity information of the measurement object recorded by the image sensor having a flat image plane via the optical distance from the measurement object to the second pixel sensor group, and the interpolated data D13b approximates the intensity information of the measurement object recorded by the image sensor having a flat image plane via the optical distance from the measurement object to the third pixel sensor group. Accordingly, data corresponding to the intensity information at three different optical distances from the measurement object are recorded with a single-shot exposure.

The number of pixel sensor groups may be four or more. However, the more the number of pixel sensor groups, the more the lack of extracted data, thereby leading to more errors in generating interpolated data, and thus the measurement precision is likely to be decreased.

Computation Based on the Transport of Intensity Equation

Subsequently, the computer computes phase information of the measurement object from the interpolated data D11$b$, D12$b$, and D13$b$ using the transport of intensity equation (TIE). The following specifically describes the computation.

As shown in FIG. 19, a measurement is carried out to determine the intensity I(x,y,$z_0$) at the coordinate (0,0,z) of the measured plane 1 of the measurement object, the intensity I(x,y,$z_0$–d) at the coordinate (0,0,z–d) of the measured plane 2 of the same measurement object, and the intensity I(x,y,$z_0$+d) at the coordinate (0,0,z+d) of the measured plane 3 of the same measurement object. The interpolated data D11$b$ shown in FIG. 18($a$) approximates the intensity I(x,y,$z_0$–d). The interpolated data D12$b$ shown in FIG. 18($b$) approximates the intensity I(x,y,$z_0$). The interpolated data D13$b$ shown in FIG. 18($c$) approximates the intensity I(x,y,$z_0$+d).

Taylor expansion of the intensity I(x,y,$z_0$+d) and the intensity I(x,y,$z_0$–d) is represented by the following equations (4) and (5).

$$I(x, y, z_0 + d) = I(x, y, z_0) + \frac{\partial I}{\partial z}(d) + \frac{\partial^2 I}{\partial z^2}\frac{d^2}{2!} + O[(d)^3] + \ldots \quad (4)$$

$$I(x, y, z_0 - d) = I(x, y, z_0) + \frac{\partial I}{\partial z}(-d) + \frac{\partial^2 I}{\partial z^2}\frac{(-d)^2}{2!} + O[(-d)^3] + \ldots \quad (5)$$

As shown in the following equation (6), the intensity differential of interest at the measured plane 2 approximates the difference in the intensity between the measured planes 1 and 3.

$$\frac{\partial I}{\partial z} \approx \frac{I(x, y, z_0 + d) - I(x, y, z_0 - d)}{2d} \quad (6)$$

As described above, when the intensity I(x,y,$z_0$) and the differential $\partial I/\partial z$ are known, the phase information of the measurement object can be computed using the transport of intensity equation (1) described in Embodiment 1. This makes it possible to obtain the complex amplitude information of the measurement object using the transport of intensity equation on the basis of the intensity information recorded by the image sensor including three pixel sensor groups at different optical distances from the measurement object with a single-shot exposure. A difference in height by distance d is present between pixel sensors P1 and pixel sensors P2 as well as between pixel sensors P2 and pixel sensors P3. However, the same measurement can be applied when the height difference between pixel sensors P1 and pixel sensors P2 differs from the height difference between pixel sensors P2 and pixel sensors P3.

Other Structures

Figure 15:
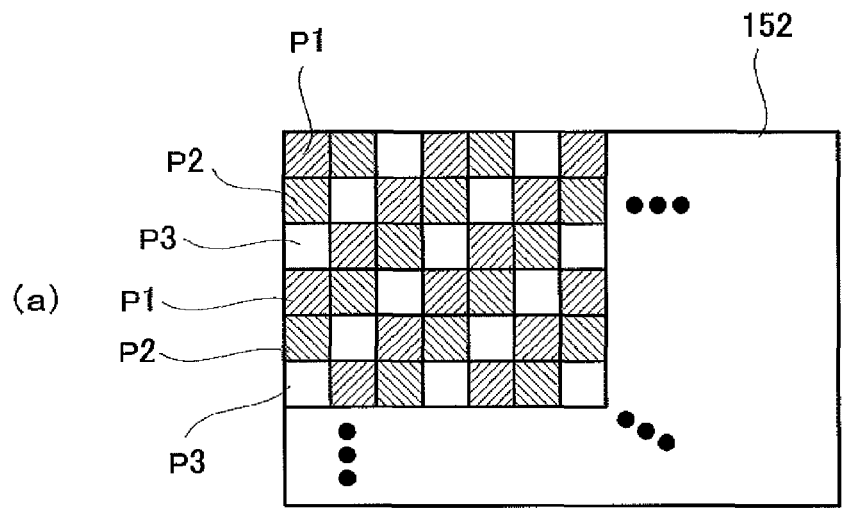
FIGS. 15(a) and 15(b), respectively, are a top view and a cross-sectional view of an image sensor according to Embodiment 2 of the present invention.
Figure 15:
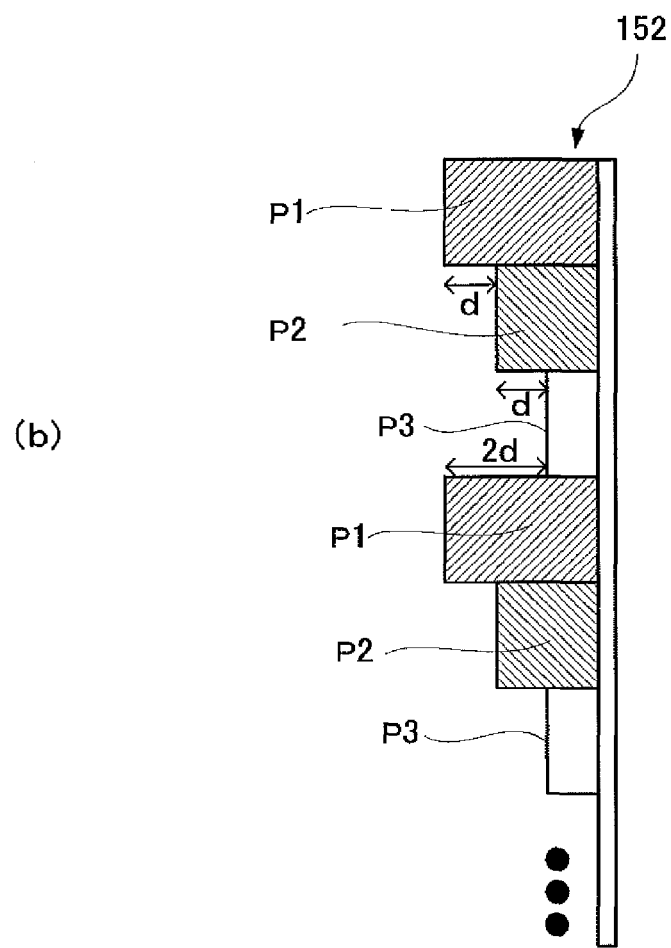

In this embodiment, to form three pixel sensor groups that differ from one another in the optical distances from the measurement object as shown in FIG. 15($b$), a difference in the spatial distance from the measurement object is made between pixel sensors P1, P2, and P3. However, the present invention is not limited to this embodiment. For example, in the structure shown in FIG. 14, an array including three regions with different refractive indices, thus having a plurality of refractive indices, may be used to form three pixel sensor groups that differ from one another in the optical distance from the measurement object.

Supplemental

As described above, the measurement apparatus according to the embodiments of the present invention can obtain complex amplitude information of the measurement object using a single image sensor with a single-shot exposure. The measurement apparatus can obtain a momentary complex amplitude distribution or a three-dimensional geometry of an object. Further, the measurement apparatus can record the change in complex amplitude distribution of a moving object or a three-dimensional moving image of a moving object by continuously recording the object.

The measurement apparatus according to the embodiments of the present invention has the same advantages as the conventional measurement apparatus 60 shown in FIG. 30; i.e., the optical system is simple, the device is unsusceptible to the recording environment (e.g., vibration), and the device can measure a self-illuminating object.

In the above embodiments, the transport of intensity equation is used to obtain phase information of the measurement object. However, the present invention is not limited to these embodiments. For example, phase information can be obtained from Fourier transformation. Using Fourier transformation, the phase information $\varphi_z$(x, y) of a measurement object can be obtained from the following equation (7).

$$\varphi_z(x,y) = -\Im^{-1} q^{-2} \Im\{\nabla \cdot [I_z^{-1}(x,y)] \nabla \psi_z(x,y)\} \quad (7)$$

As used herein, $\Im$ and $\Im^{-1}$ each represent Fourier transform and inverse Fourier transform, and q represents a coordinate of Fourier plane. $\psi_z$(x, y) is expressed by the following equation (8).

$$\psi_z(x, y) = \Im^{-1} q^{-1} \Im\left[k \frac{\partial I_z(x, y)}{\partial z}\right] \quad (8)$$

In the above embodiments, extracted data corresponding to respective pixel sensor groups are generated from the luminance information of a measurement object as shown in FIGS. 5 to 7, and the extracted data are each interpolated to generate interpolated data to thereby obtain phase information from the stored data. However, phase information may be obtained without generating extracted data from luminance information.

Figure 20:
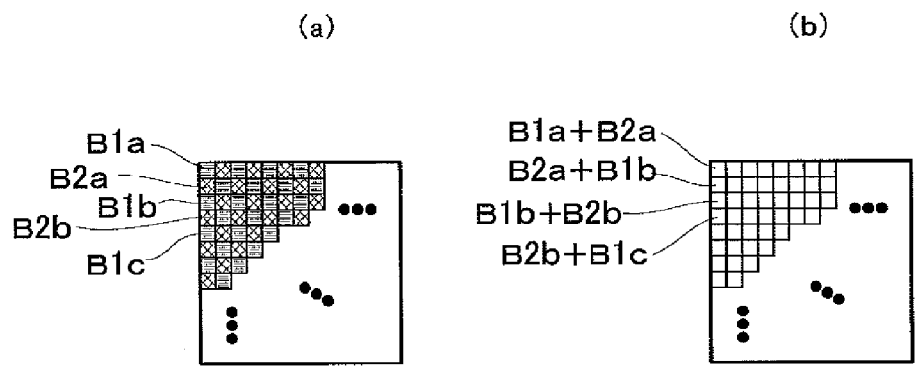
FIGS. 20(a) and 20(b), respectively, describe the method for determining phase information without generating extracted data.

The following describes an example of how to obtain phase information from the luminance information shown in FIG. 5 without generating extracted data. Each pixel of the luminance information shown in FIG. 5 is assumed to be disposed in the order of pixel B1$a$, B2$a$, B1$b$, B2$b$, B1$c$ . . . as shown in FIG. 20($a$). Next, the phase information of each of the combinations of two longitudinally adjoining pixels (pixels B1$a$ and B2$a$, pixels B2$a$ and B1$b$, pixels B1$b$ and B2$b$, pixels B2$b$ and B1$c$ . . . ) is determined using the transport of intensity equation.

FIG. 20($b$) shows the obtained phase distribution. In FIG. 20($b$), B1$a$+B2$a$ indicates the phase distribution obtained from two pixels B1$a$ and B2$a$, and B2$a$+B1$b$ indicates the phase distribution obtained from two pixels B2$a$ and B1$b$.

As described above, it is possible to obtain the complex amplitude information of a measurement object by determining the phase information of each of the focused pixel and a pixel immediately below the focused pixel using the transport of intensity equation, and shifting the focused pixel to repeat the same in the luminance information of the measurement object.

The pixels in a combination of pixels for obtaining phase information are not necessarily two adjacent pixels, and any pixels can be combined. The number of pixels for combination is not limited to 2, and may be 3 or more. Phase information may be obtained using Fourier transformation, instead of the transport of intensity equation.

The present invention is not limited to the above-described embodiments, and various modifications are possible without departing from the scope of the claims. The technical scope of the present invention also encompasses embodiments in which techniques disclosed in the above-described embodiments are suitably combined.

EXAMPLES

To confirm the effectiveness of the measurement apparatus according to the present invention, computer simulation was performed. Simulation using a conventional measurement apparatus was also performed in Comparative Examples.

Example 1

Figure 21:
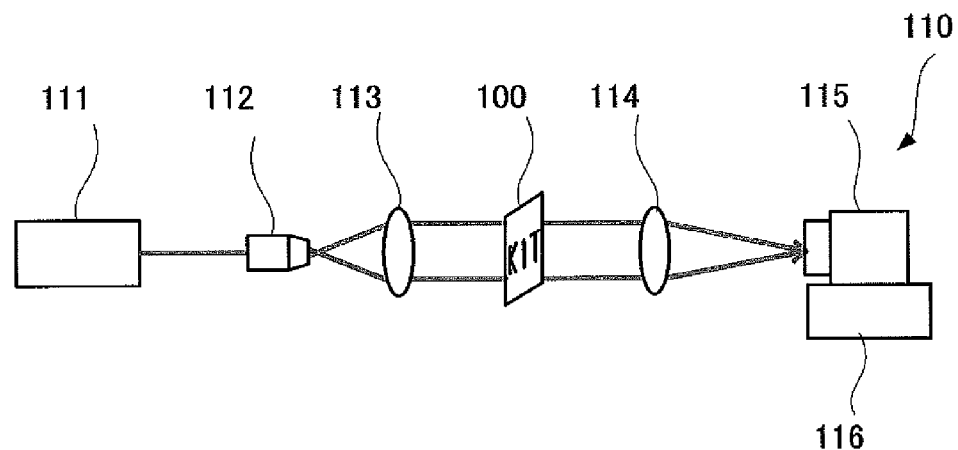
FIG. 21 is a block diagram showing the structure of a measurement apparatus according to Example 1 of the present invention.

FIG. 21 is a block diagram showing the structure of a measurement apparatus 110 according to Example 1. The measurement apparatus 110 comprises a light source 111, an objective lens 112, lenses 113 and 114, and a camera 115. The measurement object 100 is a flat plate-like object on which the characters "KIT" are printed, with the central part being slightly curved toward the camera 115.

A laser light source with a wavelength of 633 nm was used for the light source 111. The camera 115 comprises an image sensor with 512×512 pixels and a pixel size of 2.2 μm, and is placed on a stationary stage 116. The camera 115 comprises an image sensor including two pixel sensor groups that differ from each other in the optical distance from the measurement object 100.

A single-shot recording was performed by the camera 115, and a computer, which is not shown, generated two sets of interpolated data from the intensity information of the measurement object 100. The phase information of the measurement object 100 was then determined using the transport of intensity equation.

Example 2

Figure 22:
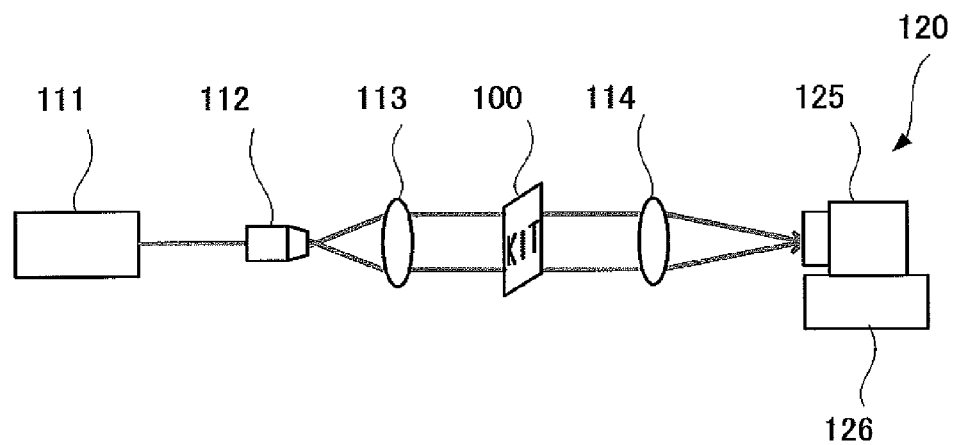
FIG. 22 is a block diagram showing the structure of a measurement apparatus according to Example 2 of the present invention.

FIG. 22 is a block diagram showing a measurement apparatus 120 according to Example 2. The measurement apparatus 120 has the structure of the measurement apparatus 110 according to Example 1 with the camera 115 being replaced by the camera 125. The camera 125 comprises an image sensor including three pixel sensor groups that differ from one another in the optical distances from the measurement object 100.

A single-shot recording was performed by the camera 125, and a computer, which is not shown, generated three sets of interpolated data from the intensity information of the measurement object 100. The phase information of the measurement object 100 was then determined using the transport of intensity equation.

Comparative Example 1

Figure 23:
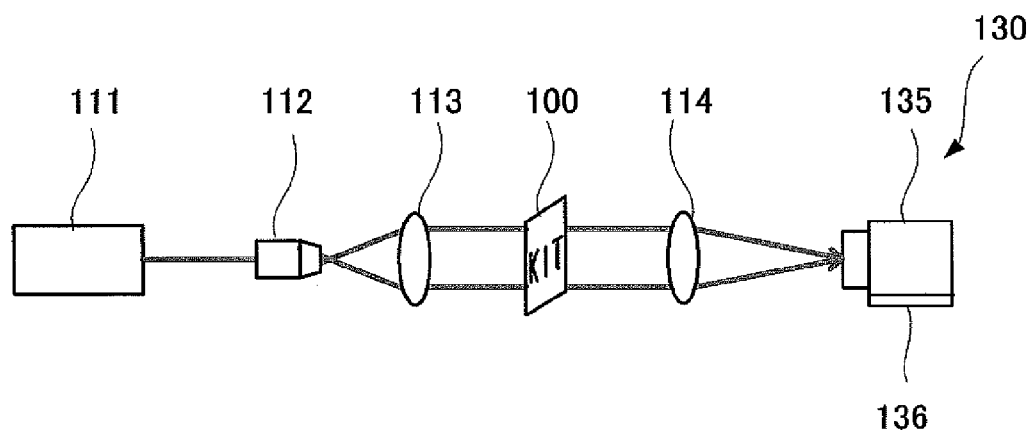
FIG. 23 is a block diagram showing the structure of a measurement apparatus according to Comparative Example 1 of the present invention.

FIG. 23 is a block diagram showing the structure of a measurement apparatus 130 according to Comparative Example 1. The measurement apparatus 130 comprises a light source 111, an objective lens 112, lenses 113 and 114, and a camera 135. The image sensor of the camera 135 is a conventional image sensor in which pixel sensors are all positioned at the same optical distance from the measurement object 100. The camera 135 is placed on a fine movement stage 136. While the fine movement stage 136 was being moved along the propagation direction of object light, the measurement object 100 was recorded in two shots by the camera 135. A computer, which is not shown, computed the phase information of the measurement object 100 from the change in the intensity information of the measurement object 100 using the transport of intensity equation. The difference $\Delta Z$ in the optical distance between the recorded image planes was 1 mm.

Comparative Example 2

In Comparative Example 2, while the fine movement stage 136 was being moved, the measurement object 100 was recorded in three shots by the camera 135 of the measurement apparatus 130 shown in FIG. 23, and a computer, which is not shown, computed the phase information of the measurement object 100 from the change in the intensity information of the measurement object 100 using the transport of intensity equation. The difference $\Delta Z$ in the optical distance between the recorded image planes was 1 mm.

Evaluation Results 1

Figure 24:
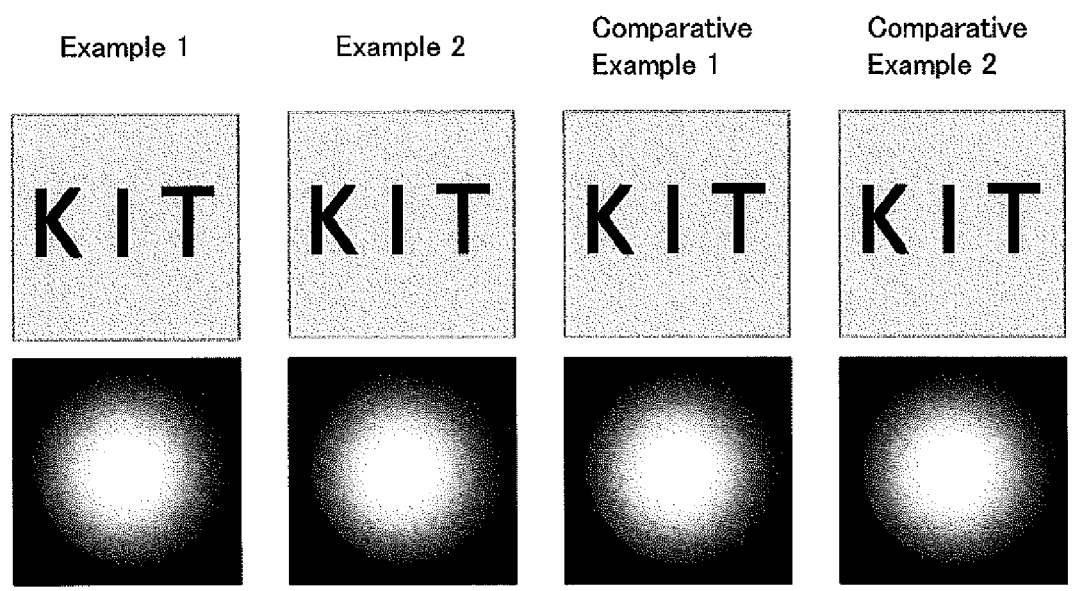
FIG. 24 shows object images and luminance information obtained in Examples 1 and 2 and Comparative Examples 1 and 2.

FIG. 24 shows object images and luminance information obtained in Examples 1 and 2 and Comparative Examples 1 and 2. Further, the cross-correlation function for Examples 1 and 2 and Comparative Examples 1 and 2 was calculated. Table 1 shows the calculation results.

TABLE 1

|  | Example 1 | Example 2 | Comparative Example 1 | Comparative Example 2 |
|---|---|---|---|---|
| Amplitude Accuracy | 1.000000 | 1.000000 | 1.000000 | 1.000000 |
| Phase Accuracy | 0.998201 | 0.996124 | 0.998210 | 0.998221 |

As used in Table 1, the amplitude accuracy and phase accuracy refer to the accuracy of the amplitude information and phase information, with the value closer to 1 being more accurate. The results clearly show that the measurement apparatus according to the present invention can obtain, with a single-shot exposure, phase information with substantially the same accuracy as that obtained by measurement with a multiple-shot exposure.

Example 3

Figure 25:
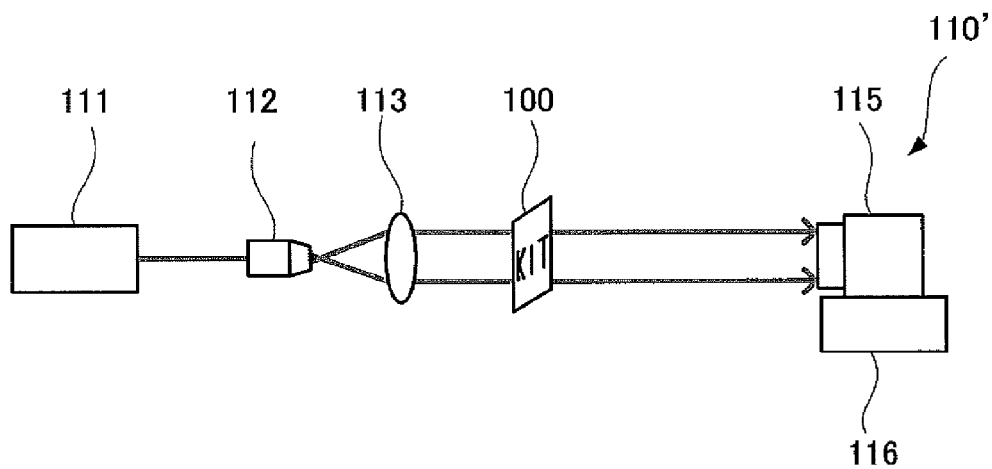
FIG. 25 is a block diagram showing the structure of a measurement apparatus according to Example 3 of the present invention.

FIG. 25 is a block diagram showing the structure of a measurement apparatus 110' according to Example 3. Specifically, Example 3 employed the measurement apparatus 110 shown in FIG. 21 according to Example 1 from which the lens 114 was removed. Other elements of the apparatus were the same as those of Example 1.

Example 4

Figure 26:
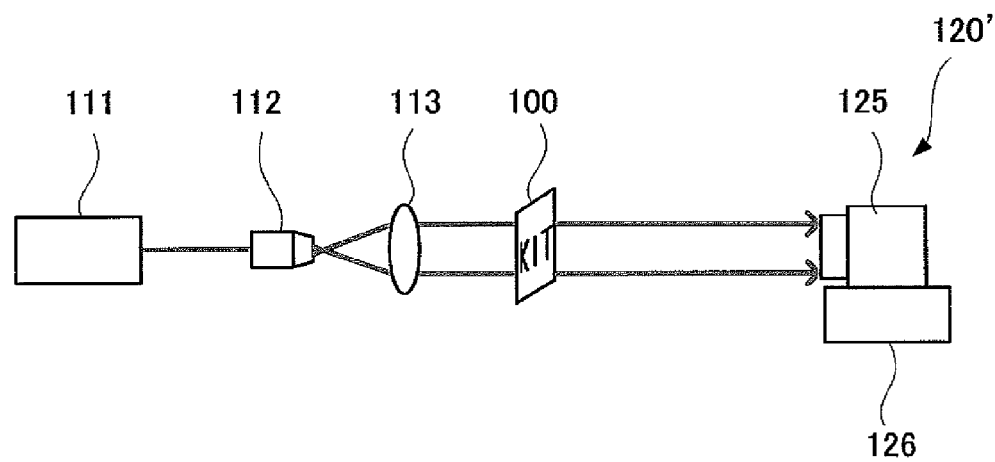
FIG. 26 is a block diagram showing the structure of a measurement apparatus according to Example 4 of the present invention.

FIG. 26 is a block diagram showing the structure of a measurement apparatus 120' according to Example 4. Specifically, Example 4 employed the measurement apparatus 120 shown in FIG. 22 according to Example 2 from which the lens 114 was removed. Other elements of the apparatus were the same as those of Example 2.

Comparative Example 3

Figure 27:
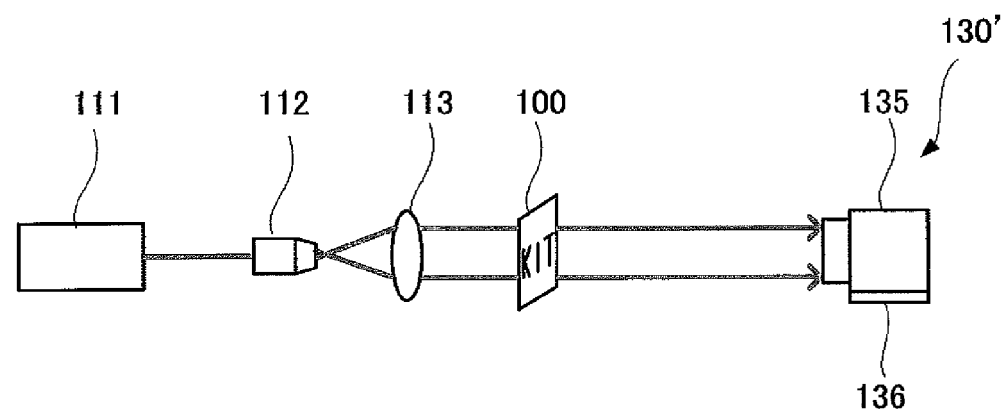
FIG. 27 is a block diagram showing the structure of a measurement apparatus according to Comparative Example 3 of the present invention.

FIG. 27 is a block diagram showing the structure of a measurement apparatus 130' according to Comparative Example 3. Specifically, Comparative Example 3 employed the measurement apparatus 130 shown in FIG. 23 according to Comparative Example 1 from which the lens 114 was removed. Other elements of the apparatus were the same as those of Comparative Example 1. While the fine movement stage 136 was being moved along the propagation direction of object light, the measurement object 100 was recorded in two shots by the camera 135. Further, the phase information of the image plane (area of interest) of the first shot was computed using two sets of intensity information, and the reverse propagation of light was computed using the intensity information and phase information of the area of interest to thereby compute the intensity information and phase information of the measurement object. The distance between the measurement object and the area of interest was 5 mm.

Comparative Example 4

In Comparative Example 4, while the fine movement stage 136 was being moved along the propagation direction of object light, the measurement object 100 was recorded in three shots by the camera 135 of the measurement apparatus 130' shown in FIG. 27. Further, the phase information of the image plane (area of interest) of the first shot was computed using two sets of intensity information of the second and third shots, and the reverse propagation of light was computed using the intensity information and phase information of the area of interest to thereby compute the intensity information and phase information of the measurement object. The distance between the measurement object and the area of interest was 5 mm.

Evaluation Results 2

Figure 28:
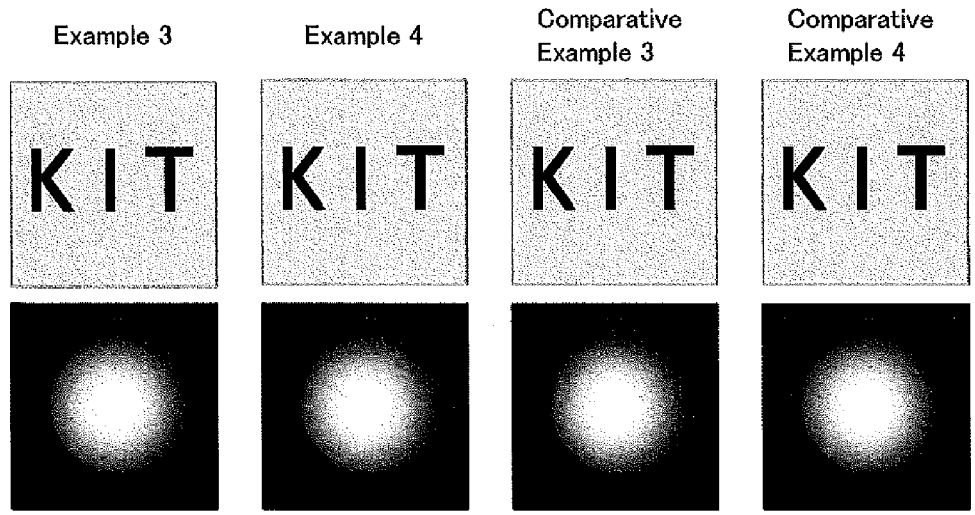
FIG. 28 shows object images and luminance information obtained in Examples 3 and 4 and Comparative Examples 3 and 4.
Figure 29:
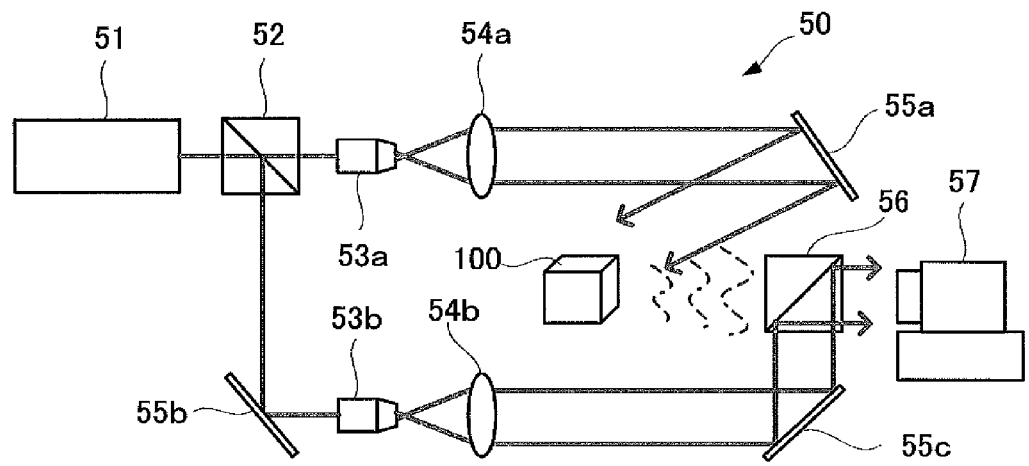
FIG. 29 is a block diagram showing the structure of a conventional holography apparatus.

FIG. 28 shows the object images and luminance information obtained in Examples 3 and 4 and Comparative Examples 3 and 4. Further, the cross-correlation function for Examples 3 and 4 and Comparative Examples 3 and 4 was calculated. Table 2 shows the calculation results.

TABLE 2

|  | Example 3 | Example 4 | Comparative Example 3 | Comparative Example 4 |
|---|---|---|---|---|
| Amplitude Accuracy | 1.000000 | 1.000000 | 1.000000 | 1.000000 |
| Phase Accuracy | 0.998212 | 0.997532 | 0.998214 | 0.998219 |

The results clearly show that the measurement apparatus according to the present invention can obtain, with a single-shot exposure, phase information with substantially the same accuracy as that obtained by measurement with a multiple-shot exposure.

INDUSTRIAL APPLICABILITY

As described above, the present invention makes it possible to obtain the complex amplitude information (intensity information and phase information) of an object with a single-shot exposure, thus enabling highly accurate measurement of the complex amplitude information (intensity information and phase information) of a moving object. Achieving a high SN ratio in complex amplitude information measurement is critical for devices such as biological microscopes for vital observations and measurements, industrial inspection devices for parts and products, electronic microscopes for observing and measuring molecular changes, and devices for measuring the distribution, shape, size, or density of particles or fluids. Thus, the present invention is expected to help in the achievement of drug development, moving image measurement with an electronic microscope, product inspection devices, and product manufacturing equipment. This will contribute largely to the development of high, globally competitive products in the manufacturing and biotechnology industries, the driving engine of our economy.

DESCRIPTION OF REFERENCE NUMERALS 10 complex amplitude information measurement apparatus (measurement apparatus)
11 light source
12 objective lens
13 lens
14 mirror
15 camera
16 computer
20 stationary stage
25 camera
25' camera
35 camera
45 camera
55 camera
55' camera
100 measurement object
151 image sensor
152 image sensor
161 extraction section
162 interpolation section
163 calculation section
251 image sensor
251 image sensor
252 polarizer
253 wave plate
254 micro-polarizer array
351 image sensor
352 array having a plurality of refractive indices
451 image sensor
452 array having a plurality of refractive indices
551 image sensor
552 wave plate array
553 polarizer
B1 pixel
B2 pixel
B11 pixel
B12 pixel
B13 pixel
D1a extracted data
D2a extracted data
D1b interpolated data
D2b interpolated data
D11a extracted data
D12a extracted data
D13a extracted data
D11b interpolated data
D12b interpolated data D13b interpolated data
H vacant region
P1 pixel sensor (pixel sensors constituting the first pixel sensor group)
P2 pixel sensor (pixel sensors constituting the second pixel sensor group)
P3 pixel sensor (pixel sensors constituting the third pixel sensor group)
R1 region
R2 region
R11 region
R12 region
R21 region
R22 region
R51 region
R52 region

The invention claimed is:

1. A measurement apparatus comprising:
a plurality of pixel sensor groups for generating a difference from one pixel sensor group to another in optical distance of object light traveling from a measurement object,
an image sensor for recording, with a single-shot exposure, the object light that has passed through or been reflected from the plurality of pixel sensor groups to obtain intensity information of the measurement object, and
a phase information computing unit for computing, on the basis of the intensity information, phase information of the measurement object,
wherein the phase information computing unit comprises:
an extraction section for extracting, on the basis of the intensity information, pixel values obtained by recording the object light that has passed through or been reflected from the plurality of pixel sensor groups so as to generate extracted data corresponding to the respective pixel sensor groups;
an interpolation section for interpolating each of the extracted data to generate interpolated data; and
a calculation section for obtaining the phase information from each of the interpolated data.

2. The measurement apparatus according to claim 1, wherein the calculation section obtains the phase information on the basis of transport of intensity equation.

3. The measurement apparatus according to claim 1, wherein the calculation section obtains the phase information on the basis of Fourier transformation.

4. A measurement apparatus comprising:
a plurality of pixel sensor groups for generating a difference from one pixel sensor group to another in optical distance of object light traveling from a measurement object, wherein pixel sensors of the pixel sensor groups that differ from each other in the optical distance are alternately arrayed in the lengthwise and crosswise directions,
an image sensor for recording, with a single-shot exposure, the object light that has passed through or been reflected from the plurality of pixel sensor groups to obtain intensity information of the measurement object, the image sensor corresponding to each pixel sensor of the pixel sensor groups; and
a phase information computing unit for computing, on the basis of the intensity information, phase information of the measurement object,
wherein the phase information computing unit comprises a calculation section for obtaining the phase information from a combination of different and adjacent pixel values included in the intensity information, the different and adjacent pixel values corresponding to the respective pixel sensor groups.

5. A measurement apparatus comprising,
a plurality of pixel sensor groups for generating a difference from one pixel sensor group to another in optical distance of object light traveling from a measurement object;
an image sensor for recording, with a single-shot exposure, the object light that has passed through or been reflected from the plurality of pixel sensor groups to obtain intensity information of the measurement object;
a phase information computing unit for computing, on the basis of the intensity information, phase information of the measurement object; and
between the measurement object and an image plane of the image sensor:
a polarizer for converting object light from the measurement object into linearly polarized light;
a wave plate having a refractive index that varies with an vibration direction of light incident thereon, the wave plate being for separating light that has been transmitted through the polarizer into linearly polarized light components that are perpendicular to each other; and
a micro-polarizer array including first regions that allow only a slow axis component of the linearly polarized light components to be transmitted therethrough and second regions that allow only a fast axis component of the linearly polarized light components to be transmitted therethrough,
wherein the plurality of pixel sensor groups consist of a first pixel sensor group and a second pixel sensor group; and the first regions overlap with pixel sensors constituting the first pixel sensor group; and the second regions overlap with pixel sensors constituting the second pixel sensor group.

6. A measurement apparatus, comprising
a plurality of pixel sensor groups for generating a difference from one pixel sensor group to another in optical distance of object light traveling from a measurement object;
an image sensor for recording, with a single-shot exposure, the object light that has passed through or been reflected from the plurality of pixel sensor groups to obtain intensity information of the measurement object; and
a phase information computing unit for computing, on the basis of the intensity information, phase information of the measurement object;
wherein the object light is linearly polarized light, the apparatus comprising, between the measurement object and an image plane of the image sensor, a wave plate having a refractive index that varies with an vibration direction of light incident thereon, the wave plate being for separating the linearly polarized light into linearly polarized light components that are perpendicular to each other; and
a micro-polarizer array including first regions that allow only a slow axis component of the linearly polarized light components to be transmitted therethrough and second regions that allow only a fast axis component of the linearly polarized light components to be transmitted therethrough,
wherein the plurality of pixel sensor groups consist of a first pixel sensor group and a second pixel sensor group; and the first regions overlap with pixel sensors constituting the first pixel sensor group; and the second regions overlap with pixel sensors constituting the second pixel sensor group.

7. A measurement apparatus comprising,
a plurality of pixel sensor groups for generating a difference from one pixel sensor group to another in optical distance of object light traveling from a measurement object;
an image sensor for recording, with a single-shot exposure, the object light that has passed through or been reflected from the plurality of pixel sensor groups to obtain intensity information of the measurement object;
a phase information computing unit for computing, on the basis of the intensity information, phase information of the measurement object; and
between the measurement object and an image plane of the image sensor:
a polarizer for converting object light from the measurement object into linearly polarized light; and
a wave plate array including first regions and second regions,
   the first regions having a refractive index that varies with an vibration direction of light incident thereon, such that a linearly polarized light component in a first vibration direction experiences the highest refractive index,
   the second regions having a refractive index that varies with an vibration direction of light incident thereon, such that a linearly polarized light component in a second vibration direction, which is different from the first vibration direction, experiences the highest refractive index,
wherein the plurality of pixel sensor groups consist of a first pixel sensor group and a second pixel sensor group; and the first regions overlap with pixel sensors constituting the first pixel sensor group; and the second regions overlap with pixel sensors constituting the second pixel sensor group.

8. A measurement apparatus, comprising
a plurality of pixel sensor groups for generating a difference from one pixel sensor group to another in optical distance of object light traveling from a measurement object;
an image sensor for recording, with a single-shot exposure, the object light that has passed through or been reflected from the plurality of pixel sensor groups to obtain intensity information of the measurement object; and
a phase information computing unit for computing, on the basis of the intensity information, phase information of the measurement object;
wherein the object light is linearly polarized light, the apparatus comprising, between the measurement object and an image plane of the image sensor,
a wave plate array including first regions and second regions,
   the first regions having a refractive index that varies with an vibration direction of light incident thereon, such that a linearly polarized light component in a first vibration direction experiences the highest refractive index,
   the second regions having a refractive index that varies with an vibration direction of light incident thereon, such that a linearly polarized light component in a second vibration direction, which is different from the first vibration direction, experiences the highest refractive index,
wherein the plurality of pixel sensor groups consist of a first pixel sensor group and a second pixel sensor group; and the first regions overlap with pixel sensors constituting the first pixel sensor group; and the second regions overlap with pixel sensors constituting the second pixel sensor group.

* * * * *